United States Patent
Sano et al.

(10) Patent No.: US 8,259,554 B2
(45) Date of Patent: Sep. 4, 2012

(54) OPTICAL HEAD DEVICE, OPTICAL INFORMATION DEVICE, AND DIFFRACTIVE ELEMENT

(75) Inventors: Kousei Sano, Osaka (JP); Hirotaka Ueno, Osaka (JP)

(73) Assignee: Panasonic Corporation, Osaka (JP)

(*) Notice: Subject to any disclaimer, the term of this patent is extended or adjusted under 35 U.S.C. 154(b) by 182 days.

(21) Appl. No.: 12/680,917

(22) PCT Filed: Oct. 1, 2008

(86) PCT No.: PCT/JP2008/002760
§ 371 (c)(1),
(2), (4) Date: Mar. 31, 2010

(87) PCT Pub. No.: WO2009/044545
PCT Pub. Date: Apr. 9, 2009

(65) Prior Publication Data
US 2010/0208568 A1    Aug. 19, 2010

(30) Foreign Application Priority Data
Oct. 4, 2007 (JP) .................................. 2007-260704

(51) Int. Cl.
*G11B 7/00* (2006.01)
(52) U.S. Cl. ............................... 369/112.07; 369/110.03
(58) Field of Classification Search .................. None
See application file for complete search history.

(56) References Cited

U.S. PATENT DOCUMENTS

| | | | |
|---|---|---|---|
| 6,400,664 B1* | 6/2002 | Shimano et al. | 369/44.37 |
| 2004/0081064 A1 | 4/2004 | Ohnishi et al. | |
| 2007/0133374 A1* | 6/2007 | Arai | 369/112.05 |
| 2008/0062825 A1* | 3/2008 | Arai et al. | 369/44.14 |

FOREIGN PATENT DOCUMENTS

| | | |
|---|---|---|
| JP | 11-296875 | 10/1999 |
| JP | 2004-095077 A | 3/2004 |
| JP | 2004-145915 A | 5/2004 |
| JP | 3661694 | 4/2005 |
| JP | 2005-353187 A | 12/2005 |
| JP | 2006-179184 A | 7/2006 |
| JP | 2007-035193 A | 2/2007 |
| JP | 2007-164902 A | 6/2007 |
| WO | PCT/JP2008/002760 | 10/2008 |

\* cited by examiner

*Primary Examiner* — Mohammad Ghayour
*Assistant Examiner* — Carl Adams
(74) *Attorney, Agent, or Firm* — RatnerPrestia

(57) ABSTRACT

An optical head device includes a diffraction grating which diffracts a part of the light beam which is selectively emitted from a semiconductor laser having two luminous points and is divided along a tangential direction of the track of the optical disk, a relationship of arrangement of the second and third regions corresponds to a relationship of the optical axes of the first and second light beams on the diffraction grating, the second region is located at a position crossing an optical axis of the first light beam, a phase difference between phases of the first and third regions is 180°, a phase difference between phases of the third and fourth regions is 180°, and the third region has a width which is not larger than amount of a position deviation of ±first-order diffracted light of the second light beam from zeroth-order diffracted light.

11 Claims, 19 Drawing Sheets

FIG.6 (a)
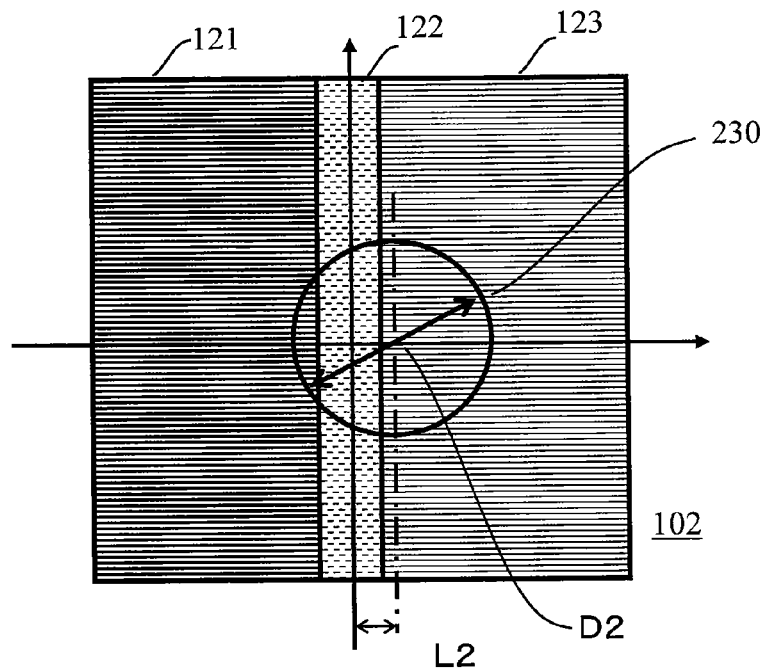
FIG.6 (b)  SUB BEAM PHASE DISTRIBUTION
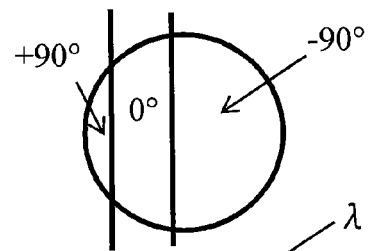
FIG.6 (c)
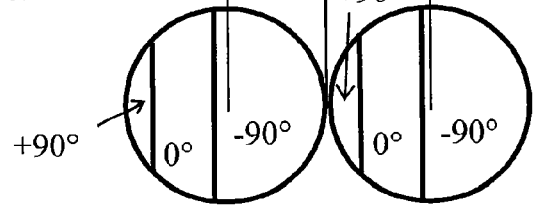
FIG.6 (d)
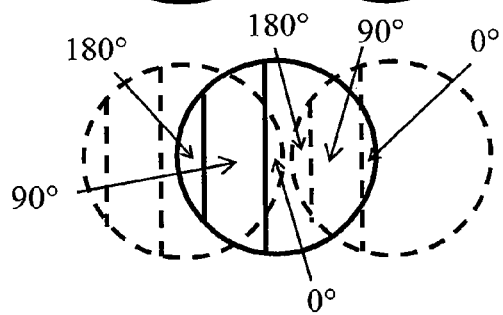

FIG.8 (a)
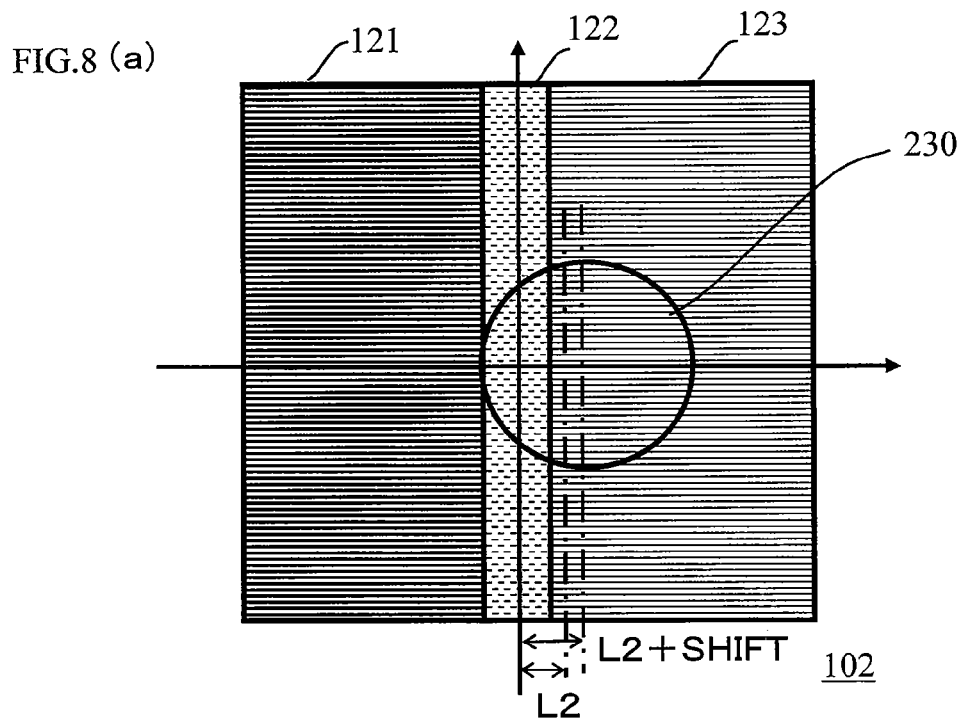
FIG.8 (b) SUB BEAM PHASE DISTRIBUTION
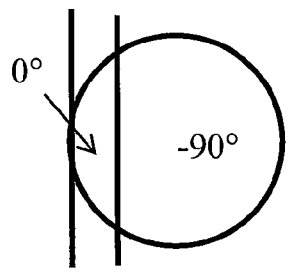
FIG.8 (c)
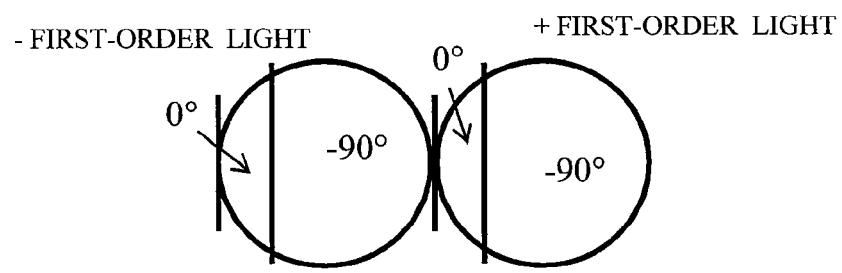
FIG.8 (d)
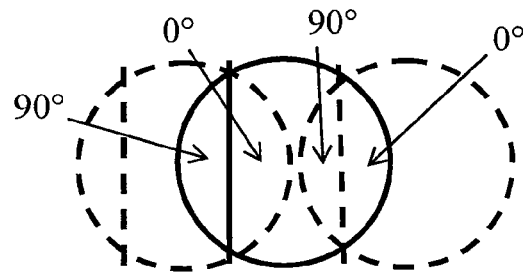

FIG.9 (a)
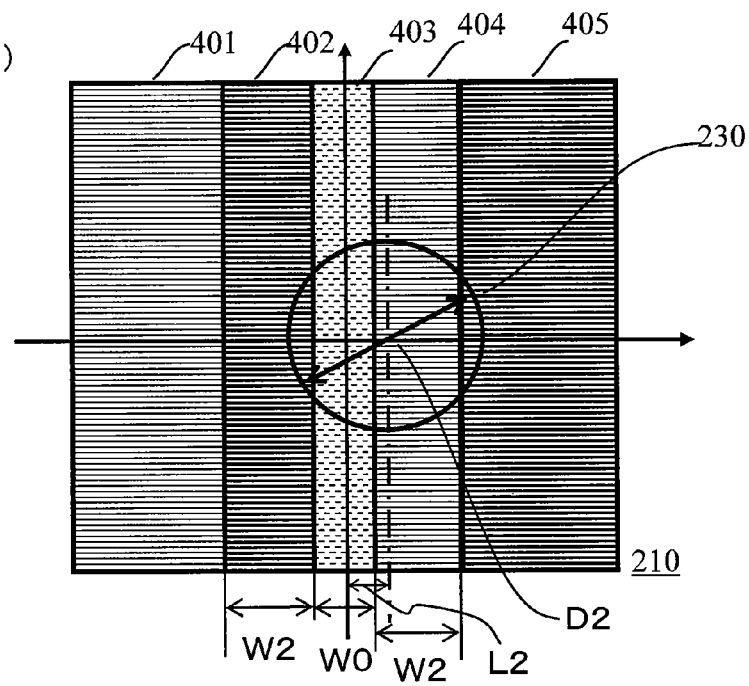
FIG.9 (b) SUB BEAM PHASE DISTRIBUTION
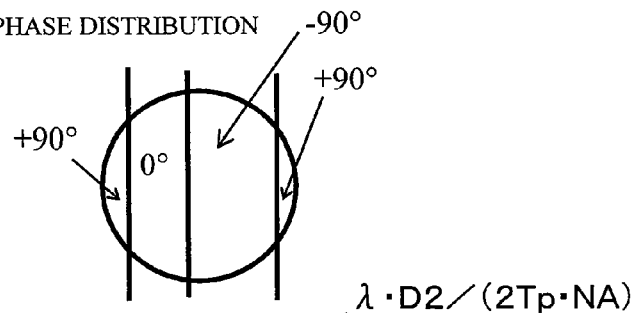
FIG.9 (c)  − FIRST-ORDER LIGHT      + FIRST-ORDER LIGHT
$\lambda \cdot D2 / (2Tp \cdot NA)$
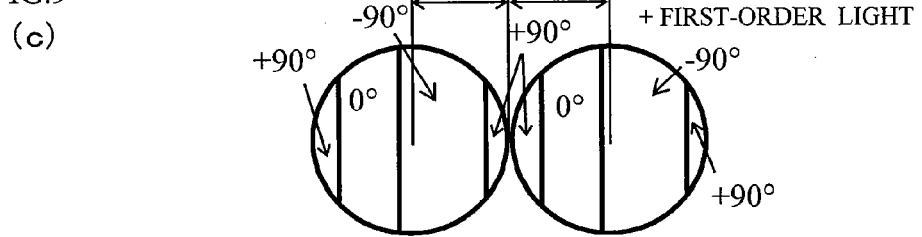
FIG.9 (d)
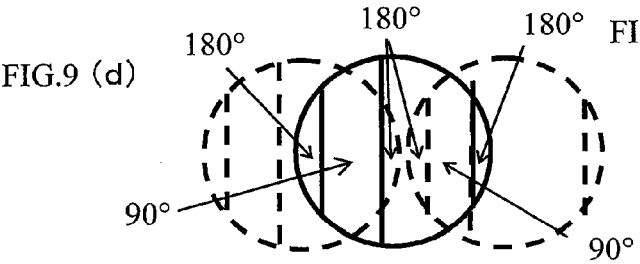
FIG.9 (e)
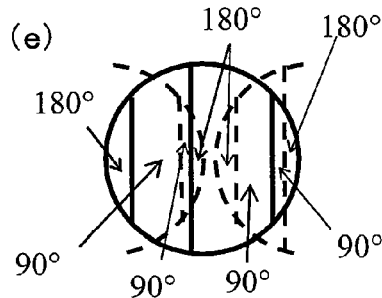

FIG.10 (a)
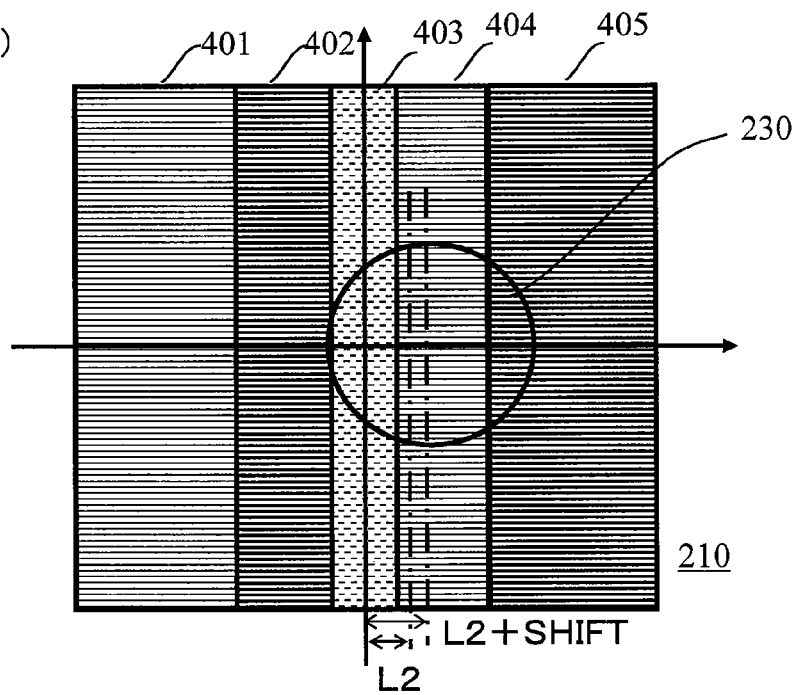
FIG.10 (b) SUB BEAM PHASE DISTRIBUTION
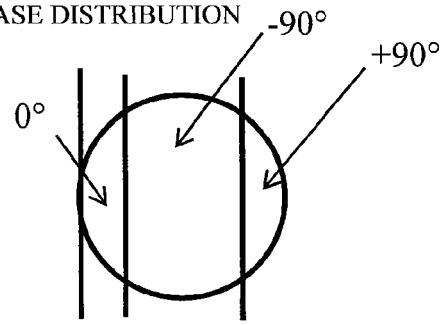
FIG.10 (c)   − FIRST-ORDER LIGHT   + FIRST-ORDER LIGHT
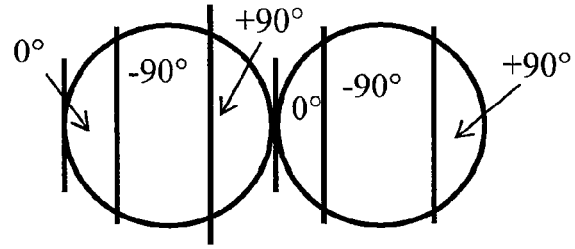
FIG.10 (d)
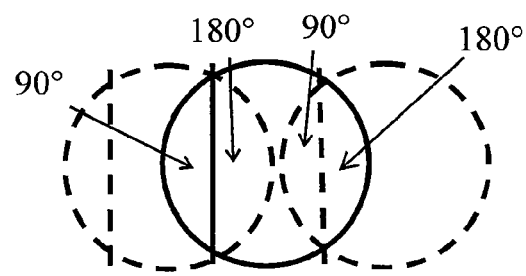

OPTICAL HEAD DEVICE, OPTICAL INFORMATION DEVICE, AND DIFFRACTIVE ELEMENT

CROSS-REFERENCE TO RELATED APPLICATIONS

This application is a U.S. national phase application of PCT International Patent Application No. PCT/JP2008/002760 filed Oct. 1, 2008, claiming the benefit of priority of Japanese Patent Application No. 2007-260704 filed Oct. 4, 2007, all of which are incorporated by reference herein in their entirety.

TECHNICAL FIELD

The present invention relates to an optical head device which records or reproduces information on an information storage medium such as an optical disk and an optical card, and an optical information apparatus and the like.

BACKGROUND ART

As an optical head device of the prior art, an example of an in-line differential push-pull method (DPP method) has been available in which the region of a diffraction grating is divided into three and the phase of diffracted light is set at −90°, 0°, and +90° in the respective regions (for example, see Japanese Patent Laid-Open No. 2006-179184 (for example, see FIG. 7)). By providing the three regions, it is possible to achieve the effect of suppressing an amplitude change of a tracking error signal even when an objective lens moves in the track traversing direction (a shift of the objective lens). FIG. 19 shows the configuration of an optical head device 100 of the prior art which is described in Japanese Patent Laid-Open No. 2006-179184.

Referring to FIG. 19, the following will describe the configuration and operations of the optical head device 100 according to the prior art.

A light beam emitted from a semiconductor laser 101 generates ±first-order diffracted light (not shown), which acts as a sub beam of the in-line differential push-pull method, through a diffraction grating 102 having divided regions. The light beam having passed through the diffraction grating 102 is reflected in a beam splitter 103 and then is collimated through a collimator lens 104. The collimated light beam is circularly polarized through a λ/4 wave plate 105, is incident on an objective lens 106, and becomes convergent light. The convergent light is emitted to an optical disk 107. The light reflected and diffracted by an information layer of the optical disk 107 passes through the objective lens 106 again and then passes through the λ/4 wave plate 105 and the collimator lens 104. After that, the light transmits through the beam splitter 103. The objective lens 106 is moved in a direction along an optical axis and a direction perpendicular to a track by an actuator 109. The light beam having transmitted through the beam splitter 103 passes through a detection lens 110 and is incident on a photodetector 111.

FIG. 20 is a front view showing a state of the divided regions of the diffraction grating 102. The diffraction grating 102 is made up of three regions 121, 122, and 123. A circle 130 in FIG. 20 is formed by projecting a light beam, which is incident into the objective lens 106, onto the diffraction grating 102 when the objective lens 106 focuses on the information layer 108 of the optical disk 107. On the regions 121, 122, and 123, grooves are formed at predetermined periods. Although the grooves are evenly spaced in the respective regions, the peaks and valleys of the grooves are each shifted in phase by 90°. In other words, when the region 122 has a phase of 0°, the region 121 has a phase of −90° and the region 123 has a phase of +90°.

Thus it is possible to add a predetermined wave front to ±first-order light acting as a sub beam. Further, when the sub beam is located on the same track as convergent zeroth-order light acting as a main beam, it is possible to obtain from the sub beam a tracking error signal phase-inverted from the main beam by 180° during the traversing of a track. By determining a difference between a tracking error signal obtained from the main beam and the tracking error signal obtained from the sub beam, a tracking error signal of a differential push-pull method is obtained.

In this case, a width W0 of the region 122 is desirably set at about 10% to 30% of the diameter of the light beam 130 on the diffraction grating 102. The provision of the region 122 can suppress an amplitude change of the tracking error signal after an operation even when the objective lens 106 moves in the track traversing direction and thus a deviation of position relationship between the regions of the diffraction grating 102 and a light beam occurs. Particularly, the effect is enhanced when the pitch of the grooves formed on the optical disk 107 is large as compared with an NA and a wavelength as on a DVD-RAM. On a DVD-RAM, information is allocated with a 0.615-μm pitch and land-and-groove recording is performed, so that the grooves where the tracking error signal is generated are each spaced at 1.23 μm from a land to the subsequent land. In this case, $\lambda/NA < Tp$ is established where a wavelength $\lambda$ is 660 nm and an NA is 0.65. In the case of a DVD-R and a CD, $\lambda/NA \geq Tp$ is established.

FIG. 21 shows an example of Japanese Patent No. 3661694 (for example, see FIG. 8).

A diffraction grating 140 indicates a diffraction grating where regions are changed at regular intervals. Regions 141 to 144 all have grooves at uniform intervals P but have diffraction gratings of different phases. The region 141 and the region 143 are in phase with each other, the region 142 and the region 144 are in phase with each other, and the regions 142 and 144 have a phase difference of 180°, from the regions 141 and 143. The regions 141 to 144 are arranged with equal widths L at regular intervals and each region has a width W1 expressed as $W1 = \lambda \cdot D/(2NA \cdot Tp)$ where $\lambda$ is the wavelength of a light beam, D is the diameter of a projection 150 of the light beam from an objective lens, NA is the numerical aperture of the objective lens, and Tp is a groove pitch on the information layer of an optical disk.

Thus even when the objective lens moves in the track traversing direction, a phase difference is always 180° on an overlapping part of ±first-order diffracted light and zeroth-order light, the overlapping part being caused by grooves on a disk. It is therefore possible to suppress an amplitude change of a tracking error signal after an operation performed by the in-line differential push-pull method.

DISCLOSURE OF THE INVENTION

Problems to be Solved by the Invention

In the configuration of the prior art, however, when the diffraction grating is shared for a light source having two luminous points like a double wavelength laser and so on, a light beam passing on the diffraction grating varies in position and thus the amplitude of the tracking error signal of the in-line differential push-pull method is considerably reduced by a movement of the objective lens in the track traversing direction, so that the tracking control cannot be performed stably.

The present invention has been devised in view of the problem of the prior art. An object of the present invention is to provide an optical head device which generates a tracking error signal enabling stable tracking control when an in-line differential push-pull method is performed using two light sources, and an optical information apparatus and the like using the same.

Means for Solving the Problems

The 1st aspect of the present invention is an optical head device, comprising:
a first light source which emits a first light beam;
a second light source which emits a second light beam;
a focusing optical system which focuses a light beam selectively emitted from said first light source and said second light source to an information recording medium having a track as convergent light;
a diffractive element which diffracts a part of said light beam passing from said light source toward said information recording medium;
a splitting instrument which splits said light beam reflected or diffracted by said information recording medium, in a direction different from a direction to said light source; and
a photodetector which receives said light beam split by said splitting instrument,
wherein said diffractive element is divided into at least four regions by dividing lines along a tangential direction of said track of said information recording medium,
said four regions are arranged in numeric order as first, second, third, and fourth regions,
in an orthogonal direction with respect to said tangential direction of said track, a relationship of arrangement of said second region and said third region corresponds to a relationship of arrangement of an optical axis of said first light beam and an optical axis of said second light beam on said diffractive element,
said second region is located at a position crossing said optical axis of said first light beam,
a phase difference between a phase of said first region and a phase of said third region is 180°,
a phase difference between a phase of said third region and a phase of said fourth region is 180°, and
said third region has a width which is not larger than amount of a position deviation of ±first-order diffracted light of said second light beam from zeroth-order diffracted light, said ±first-order diffracted light being generated by said information recording medium.

The 2nd aspect of the present invention is the optical head device according to the 1st aspect of the present invention, wherein said phase of said first region has a phase difference of 90° from a phase of said second region.

The 3rd aspect of the present invention is the optical head device according to the 2nd aspect of the present invention, wherein said phase of said second region is 0° or 180°, and said phase of said first region is +90° or −90°.

By the above configuration, even when the focusing optical system moves in the track traversing direction, the amplitude change of the tracking error signal has been reduced, thus it is possible to achieve a stable tracking control and a stable recording or reproducing information.

Moreover, for example, in case that the in-line differential push-pull method using a double wavelength laser is curried out, even when the focusing optical system moves in the track traversing direction, the amplitude change of the tracking error signal has been reduced, thus it is possible to achieve a stable tracking control and a stable recording or reproducing information.

The 4th aspect of the present invention is the optical head device according to the 2nd aspect of the present invention, wherein said second region is divided into two regions, and a phase difference between phases of said two divided regions is 180°.

The 5th aspect of the present invention is the optical head device according to the 4th aspect of the present invention, wherein a phase of one of said two divided regions is 0° and a phase of said other region is 180°.

By this configuration, spots of sub beams on an optical disk become symmetry, even when an installation angle deviation of a diffraction grating occurs, the amplitude change of the tracking error signal has been reduced, thus it is possible to achieve a more stable tracking control.

The 6th aspect of the present invention is the optical head device according to the 1st aspect of the present invention, wherein said diffractive element has a fifth region adjacent to said first region, and a phase difference between a phase of said fifth region and said phase of said first region is 180°.

The 7th aspect of the present invention is the optical head device according to the 1st aspect of the present invention, wherein when said first light beam includes a light beam corresponding to an aperture of said focusing optical system and said light beam has a diameter of D1 on said diffractive element, said second region has a width of 10% to 30% of D1.

The 8th aspect of the present invention is the optical head device according to the 1st aspect of the present invention, wherein said third region has a width W2 which is not larger than $\lambda \cdot D2/(2Tp \cdot NA)$,
where D2 is a diameter of a light beam, on said diffractive element, included in said second light beam and corresponding to an aperture of said focusing light system, Tp is a track interval of said information recording medium on which recording or reproduction is performed by said second light source, $\lambda$ is a wavelength of said second light beam, and NA is a numerical aperture of said focusing optical system of said second light beam.

The 9th aspect of the present invention is the optical head device according to the 1st aspect of the present invention, wherein said first light source and said second light source are formed on a same light emitting device, and said first beam emitted from said first light source and said second light beam emitted from said second light source have different wavelengths.

By this configuration, a positional relationship of light sources does not change, it is possible to compose a stable optical head device and also reduce the number of the parts.

The 10th aspect of the present invention is an optical information apparatus, comprising:
an optical head device according to the 1st aspect of the present invention which reads information from an information recording medium or records information on an information recording medium;
a transfer system which changes relative positions of said information recording medium and said optical head device; and
a control circuit which controls said transfer system and said optical head device.

By this configuration, it is possible to achieve an optical information apparatus having the above mentioned every effect.

The 11th aspect of the present invention is a diffractive element in an optical head device which comprises a first light source which emits a first light beam; a second light source which emits a second light beam; a focusing optical system which focuses a light beam selectively emitted from said first light source and said second light source, as convergent light to said information recording medium having a track; a splitting instrument which splits said light beam reflected or diffracted by said information recording medium, in a direction different from a direction to said light source; and a photodetector which receives said light beam split by said splitting instrument, wherein said diffractive element diffracts a part of said light beam passing from said light source toward said information recording medium, said diffractive element has at least four regions divided by dividing lines along a tangential direction of said track of said information recording medium, said four regions are arranged in numeric order as first, second, third, and fourth regions, in an orthogonal direction with respect to said tangential direction of said track, a relationship of arrangement of said second region and said third region corresponds to a positional relationship of a location where an optical axis of said first light beam and an optical axis of said second light beam pass, said second region is located at a position crossing said optical axis of said first light beam, a phase difference between a phase of said first region and a phase of said third region is 180°, a phase difference between a phase of said third region and a phase of said fourth region is 180°, and said third region has a width not larger than amount of a position deviation of ±first-order diffracted light of said second light beam from zeroth-order diffracted light, said ±first-order diffracted light being generated by said information recording medium.

Advantage of the Invention

According to the optical head device and the optical information apparatus of the present invention, it is possible to stably perform tracking control when the in-line differential push-pull method is performed using two light sources.

BRIEF DESCRIPTION OF THE DRAWINGS

FIG. 6(a) is a diagram showing the positional relationship between the division of the regions of a diffraction grating and a second light beam according to the prior art;

FIG. 6(b) is a diagram showing the phase distribution of a sub beam diffracted by the diffraction grating of the prior art;

FIG. 6(c) is a diagram showing the phase distribution of ±first-order light obtained by diffracting the sub beam which has been diffracted by the diffraction grating of the prior art, and the ±first-order light has been diffracted by a track of an optical disk;

FIG. 6(d) is a diagram showing the distribution of a phase difference between zeroth-order light and the ±first-order light obtained by diffracting the sub beam which has been diffracted by the diffraction grating of the prior art, and the zeroth-order light and the ±first-order light have been diffracted by the track of the optical disk;

FIG. 8(a) is a diagram showing the positional relationship between the division of the regions of a diffraction grating of the prior art and a second light beam when an objective lens is shifted;

FIG. 8(b) is a diagram showing the phase distribution of a sub beam diffracted by the diffraction grating of the prior art when the objected lens is shifted;

FIG. 8(c) is a diagram showing the phase distribution of ±first-order light obtained by diffracting the sub beam when the objective lens is shifted, which has been diffracted by the diffraction grating of the prior art, and ±first-order light has been diffracted by a track of an optical disk;

FIG. 8(d) is a diagram showing the distribution of a phase difference between zeroth-order light and the ±first-order light obtained by diffracting the sub beam when the objective lens is shifted, which has been diffracted by the diffraction grating of the prior art, and the zeroth-order light and the ±first-order light have been diffracted by the track of the optical disk;

FIG. 9(a) is diagram showing the positional relationship between the division of the regions of the diffraction grating and the second light beam according to the first embodiment of the present invention;

FIG. 9(b) is a diagram showing the phase distribution of the diffracted sub beam according to the first embodiment of the present invention;

FIG. 9(c) is a diagram showing the phase distribution of the ±first-order light obtained by diffracting the sub beam which has been diffracted by the diffraction grating according to the first embodiment of the present invention, and ±first-order light has been diffracted by a track of the optical disk;

FIG. 9(d) is a diagram showing the distribution of a phase difference between the zeroth-order light and the ±first-order light obtained by diffracting the sub beam which has been diffracted by the diffraction grating according to the first embodiment of the present invention, and the zeroth-order light and the ±first-order light have been diffracted by the track of the optical disk;

FIG. 9(e) is a diagram showing the distribution of a phase difference between the zeroth-order light and the ±first-order light obtained by diffracting the sub beam which has been diffracted by the diffraction grating according to the first embodiment of the present invention, and the zeroth-order light and the ±first-order light have been diffracted by the track of the optical disk;

FIG. 10(a) is a diagram showing the positional relationship between the division of the regions of the diffraction grating according to the first embodiment of the present invention and the second light beam when an objective lens is shifted;

FIG. 10(b) is a diagram showing the phase distribution of the sub beam diffracted by the diffraction grating according to the first embodiment of the present invention when the objected lens is shifted;

FIG. 10(c) is a diagram showing the phase distribution of the ±first-order light obtained by diffracting the sub beam when the objective lens is shifted, which has been diffracted by the diffraction grating according to the first embodiment of the present invention, and the ±first-order light has been diffracted by a track of the optical disk;

FIG. 10(d) is a diagram showing the distribution of a phase difference between the zeroth-order light and the ±first-order light obtained by diffracting the sub beam when the objective lens is shifted, which has been diffracted by the diffraction grating according to the first embodiment of the present invention, and the zeroth-order light and the ±first-order light have been diffracted by the track of the optical disk;

Figure 1:
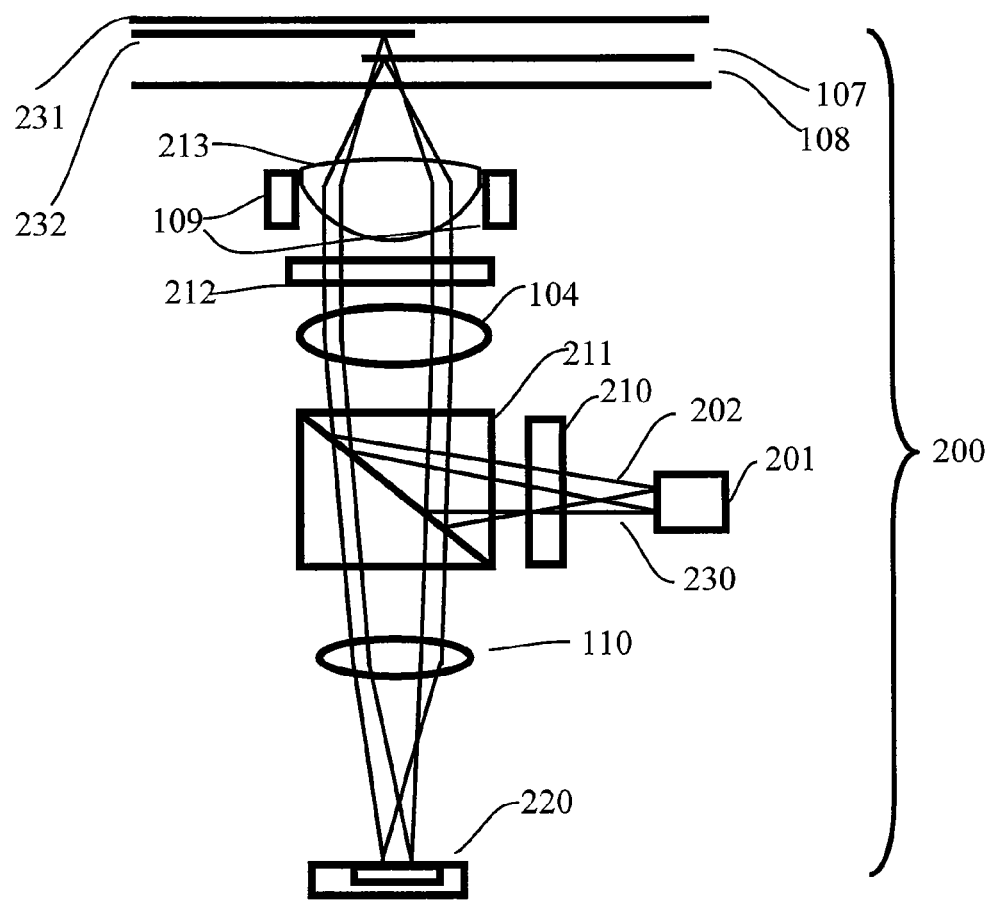
FIG. 1(a) is a structural diagram showing an optical head device according to a first embodiment of the present invention.
FIG. 1(b) is a schematic diagram showing a double-wavelength light source according to the first embodiment of the present invention.
Figure 1:
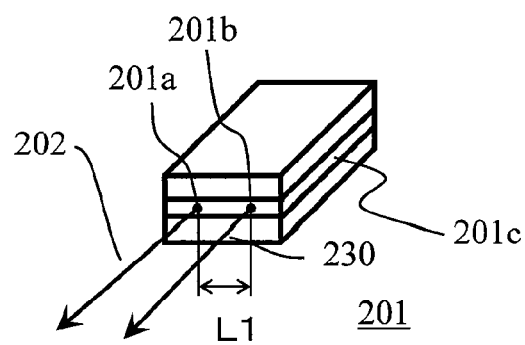

DESCRIPTION OF SYMBOLS 101 semiconductor laser (light source)
102 diffraction grating
103 beam splitter
106 objective lens (focusing optical system)
107 optical disk (information recording medium)
109 actuator
110 detection lens
111 photodetector
121-123 region
130 light beam
140 diffraction grating
141-144 region
200 optical head device
201 semiconductor laser (double-wavelength light source)
201a first luminous point
201b second luminous point
201c active layer
202 first light beam
210 diffraction grating
211 beam splitter
213 objective lens (focusing optical system)
220 photodetector
230 second light beam
231 optical disk (information recording medium)
250 main beam 251,252 sub beam
301,351 main beam
302,303,352,353 sub beam
311,361 quadruple photosensitive portion
312,313,362,363 photosensitive portion
401-405 region
440 diffraction grating
441-446 region
460 diffraction grating
462-465 region
500 optical disk drive (optical information apparatus)
501 clamper
502 turntable
503 motor (rotational system)
504 traverse (transfer system)
505 control circuit
506 signal processing circuit
507 input/output circuit

BEST MODE FOR CARRYING OUT THE INVENTION

The following will describe embodiments of the present invention with reference to the accompanying drawings.

First Embodiment

Figure 19:
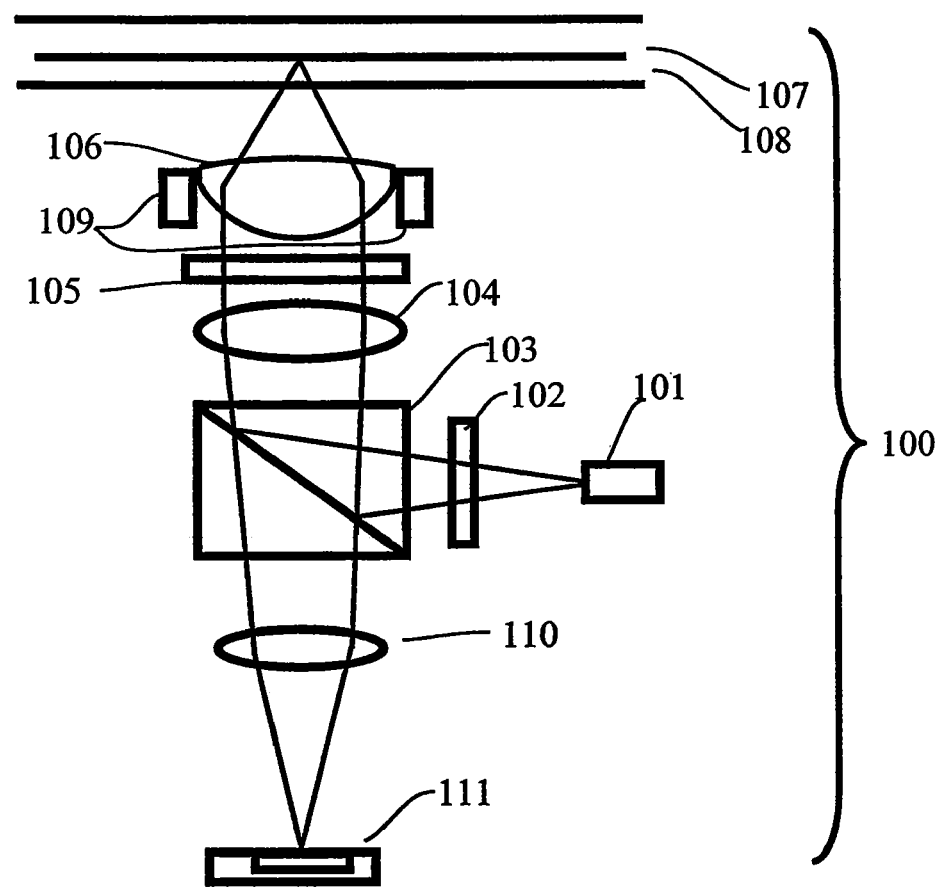
FIG. 19 is a structural diagram showing an optical head device of the prior art.
Figure 20:
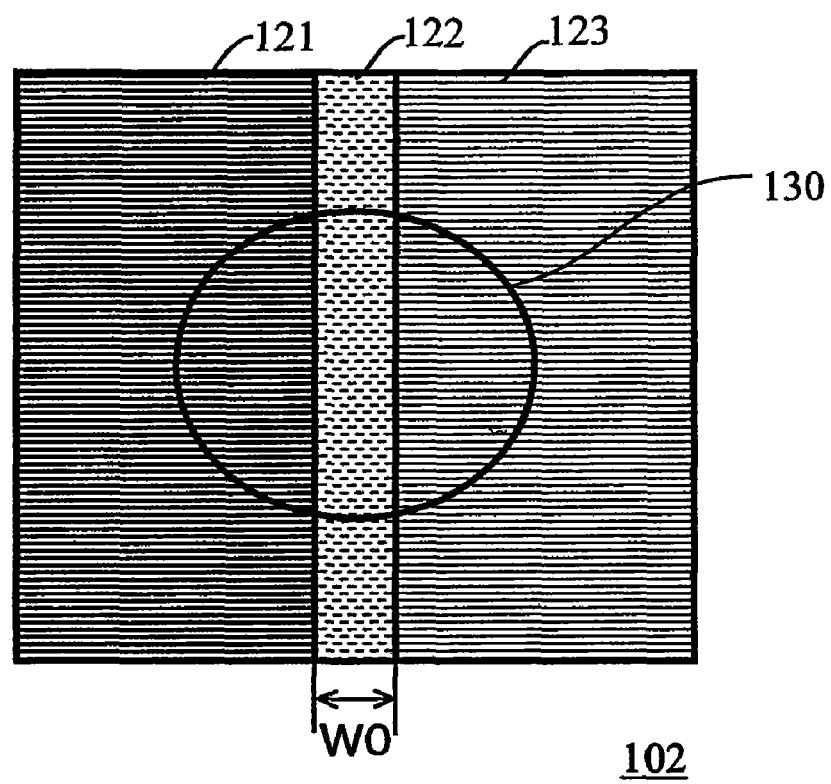
FIG. 20 is a diagram showing the divided regions of the diffraction grating according to the prior art.
Figure 21:
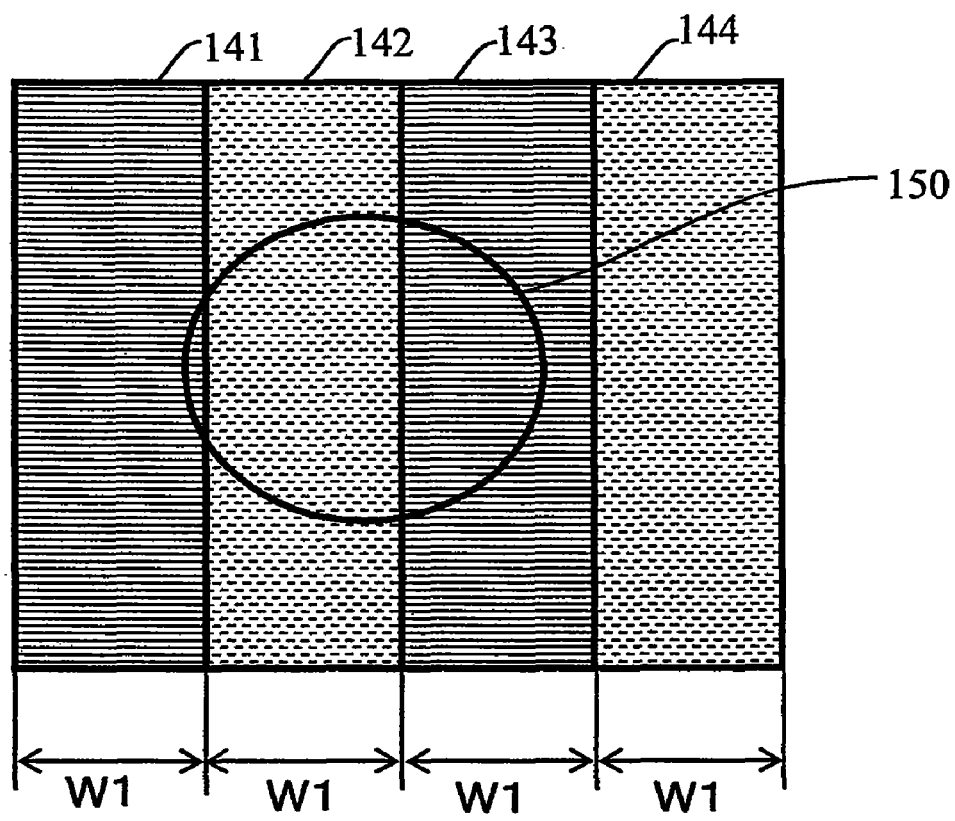
FIG. 21 is another diagram showing the divided regions of a diffraction grating according to the prior art.

FIG. 1(a) is a structural diagram showing an optical head device 200 according to a first embodiment of the present invention. The same constituent elements as those of FIG. 19 are indicated by the same reference numerals in FIG. 1(a) and the explanation thereof is omitted.

In FIG. 1(a), a semiconductor laser 201 acting as a light source is a double-wavelength semiconductor laser (double-wavelength light source). As shown in FIG. 1(b), the semiconductor laser 201 has two luminous points for each element. For example, the semiconductor laser 201 includes an active layer 201c having a first luminous point 201a and a second luminous point 201b. The first luminous point 201a emits a light beam (corresponding to a first light beam of the present invention) of red (around 660 nm) serving as a first wavelength and acts as a first light source of the present invention, and the second luminous point 201b emits a light beam (corresponding to a second light beam of the present invention) of infrared (around 785 nm) serving as a second wavelength and acts as a second light source of the present invention. Normally, the luminous points 201a and 201b of the respective light beams are spaced at a predetermined interval L1 (about 100 μm).

The explanation of FIG. 1(a) will be continued below. A light beam 202 (first light beam) emitted from the first luminous point 201a on the red side of the semiconductor laser 201 passes through a diffraction grating 210 which acts as a diffractive element of the present invention, and generates ±first-order diffracted light (not shown) acting as a sub beam of an in-line differential push-pull method.

The light beam having passed through the diffraction grating 210 is reflected in a beam splitter 211 which acts as a splitting instrument of the present invention, and then the light beam is collimated through a collimator lens 104. The collimated light beam is circularly polarized through a λ/4 wave plate 212 for a double wavelength and is incident on a compatible objective lens (hereinafter, will be simply referred to as an "objective lens") 213 which acts as a focusing optical system of the present invention, and the light beam becomes convergent light. The convergent light is emitted to an optical disk 107 (first optical disk: for example, a DVD) acting as an information recording medium of the present invention.

The light reflected and diffracted in an information layer 108 of the optical disk 107 passes through the objective lens 213 again and then passes through the λ/4 wave plate 212 and the collimator lens 104. After that, the light transmits through the beam splitter 211. The objective lens 213 is moved in a direction along an optical axis and a direction perpendicular to a track by an actuator 109. The light beam having transmitted through the beam splitter 211 passes through a detection lens 110 and is incident on a photodetector 220 acting as a photodetector of the present invention.

On the other hand, a light beam 230 (second light beam) emitted from the second luminous point 201b on the infrared side of the semiconductor laser 201 passes through the diffraction grating 210 and generates ±first-order diffracted light (not shown) acting as a sub beam of the in-line differential push-pull method. The light beam having passed through the diffraction grating 210 is reflected in the beam splitter 211 and then is collimated through the collimator lens 104. The collimated light beam is circularly polarized through the λ/4 wave plate 212 for a double wavelength, is incident on the compatible objective lens 213, and becomes convergent light. The convergent light is emitted to an optical disk 231 (second optical disk: for example, a CD) acting as an information recording medium of the present invention.

The light reflected and diffracted in an information layer 232 of the optical disk 231 passes through the objective lens 213 again and then passes through the λ/4 wave plate 212 and the collimator lens 104. After that, the light transmits through the beam splitter 211. The light beam having transmitted through the beam splitter 211 passes through the detection lens 110 and is incident on the photodetector 220.

Figure 2:
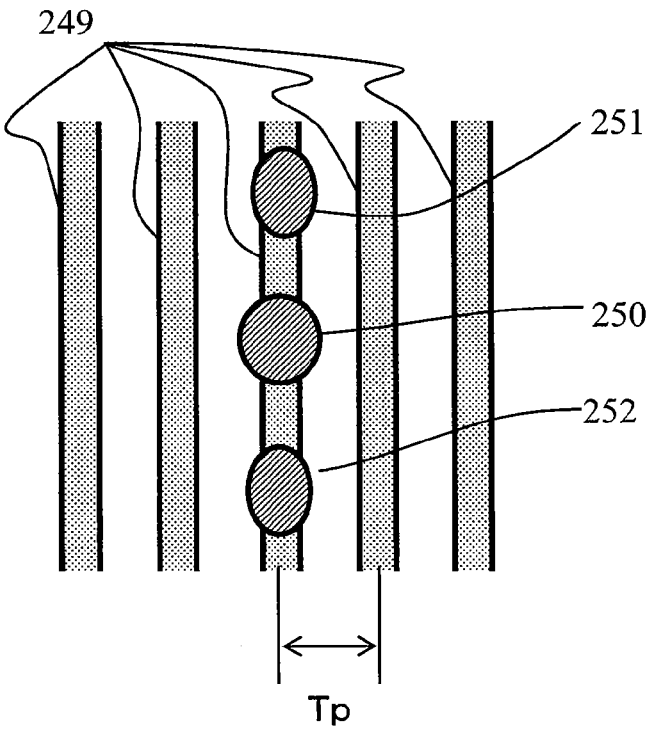
FIG. 2 is a layout drawing showing a main beam and sub beams on an optical disk according to the first embodiment of the present invention.

FIG. 2 shows the positional relationship between tracks and spots on the optical disk 107 or 231. On the optical disks 107 and 231, grooves or pit rows which serve as tracks are spaced at predetermined intervals Tp beforehand. On a read-only disk such as a ROM disk, tracks are formed by pit rows. On a writable disk, grooves are arranged and formed. In FIG. 2, grooves 249 are illustrated. An interval Tp between the grooves 249 is called a track pitch. As shown in FIG. 2, sub beams 251 and 252 of ±first-order light are arranged on the same track as a main beam 250 of zeroth-order light in the present embodiment.

Figure 3:
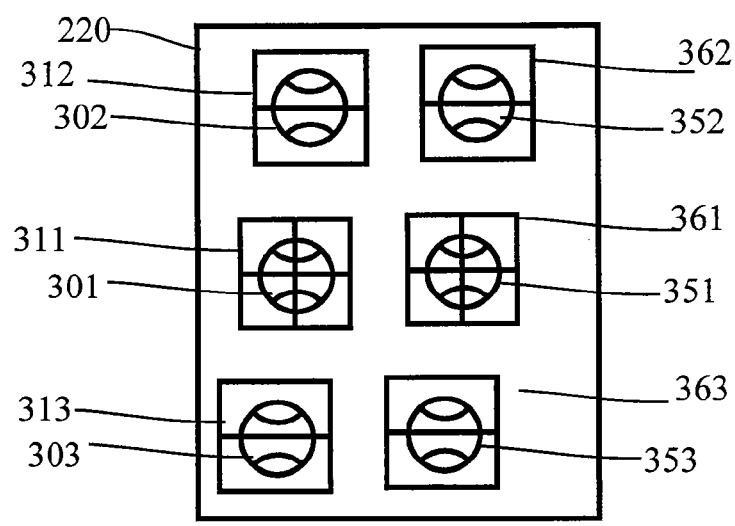
FIG. 3 is a layout drawing showing the photosensitive portions of a photodetector and light beams according to the first embodiment of the present invention.

FIG. 3 shows the positional relationship between photosensitive portions on the photodetector 220 and light beams received by the photosensitive portions. A main beam 301 having been reflected and diffracted on the optical disk 107 is received by a quadruple photosensitive portion 311, a sub beam 302 is received by a photosensitive portion 312, and a sub beam 303 is received by a photosensitive portion 313. From the quadruple photosensitive portion 311, a push-pull signal is obtained from the signals of regions of the main beam 301, the regions being divided in the track traversing direction. An RF signal which reproduces information on the optical disk 107 and a focus error signal which performs focus control according to an astigmatism method are obtained from the sum of the signals of all the divided regions. Further, a signal which performs tracking control according to a phase difference system is obtained. Moreover, from the photosensitive portions 312 and 313, the push-pull signals of the sub beams are obtained from the signals of the regions of the sub beams, the regions being divided in the track traversing direction.

Similarly, a main beam 351 having been reflected and diffracted on the optical disk 231 is received by a quadruple photosensitive portion 361, a sub beam 352 is received by a photosensitive portion 362, and a sub beam 353 is received by a photosensitive portion 363. From the quadruple photosensitive portion 361, a push-pull signal is obtained from the signals of the regions of the main beam 351, the regions being divided in the track traversing direction. An RF signal which reproduces information on the optical disk 231 and a focus error signal which performs focus control according to the astigmatism method are obtained from the sum of the signals of all the divided regions. Further, a signal which performs tracking control according to the phase difference system is obtained. Moreover, from the photosensitive portions 362 and 363, the push-pull signals of the sub beams are obtained from the signals of the regions of the sub beams, the regions being divided across the track.

The operations of the main beam and the sub beams are similarly performed as a normal operation of the differential push-pull method. In other words, a push-pull signal M of the main beam is calculated from the signals obtained from the quadruple photosensitive portion 311, a push-pull signal S1 of the sub beam 302 is calculated from the signals of the photosensitive portion 312, a push-pull signal S2 of the other sub beam 303 is calculated from the signals of the photosensitive portion 313, and a corrected push-pull signal TE is obtained from TE=M−k(S1+S2) where k is a correction coefficient.

Regarding the push-pull signal M of the main beam and the push-pull signals S1 and S2 of the sub beams, offsets having the same polarity are generated when the objective lens 213 moves in the track traversing direction. Thus the foregoing operation can reduce the influence of the offsets. The correction coefficient k is determined by a light quantity ratio between the main beam and the sub beam and a ratio of converted resistances when currents obtained from the quadruple photosensitive portion 311 and the photosensitive portions 312 and 313 are converted to voltages. Also for the quadruple photosensitive portion 361 and the photosensitive portions 362 and 363, the tracking error signal can be obtained by the same operation.

Figure 4:
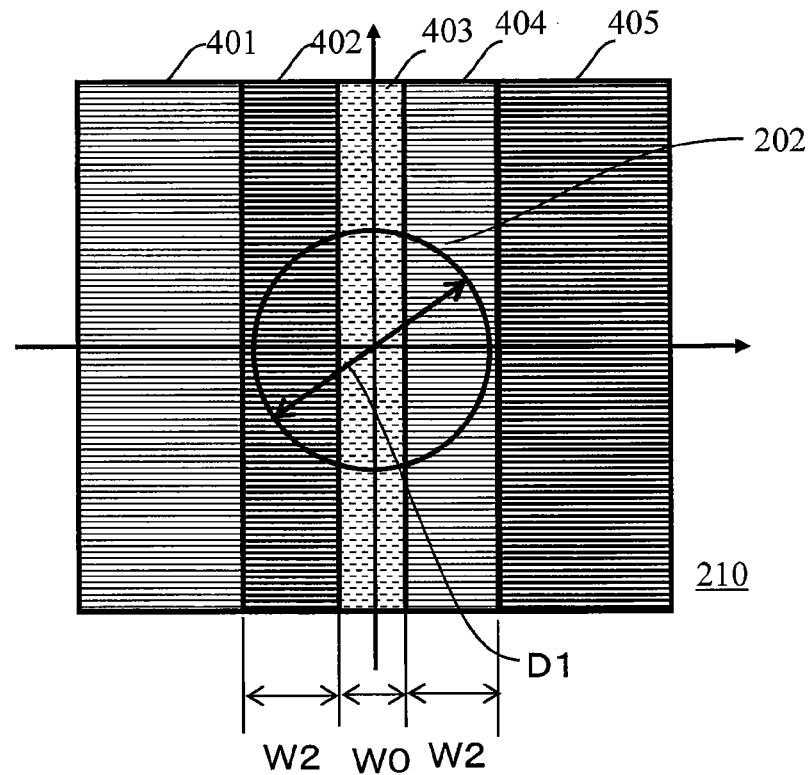
FIG. 4(a) is diagram showing the positional relationship between the division of the regions of a diffraction grating and a first light beam according to the first embodiment of the present invention.
FIG. 4(b) is diagram showing the positional relationship between the division of the regions of the diffraction grating and a second light beam according to the first embodiment of the present invention.
Figure 4:
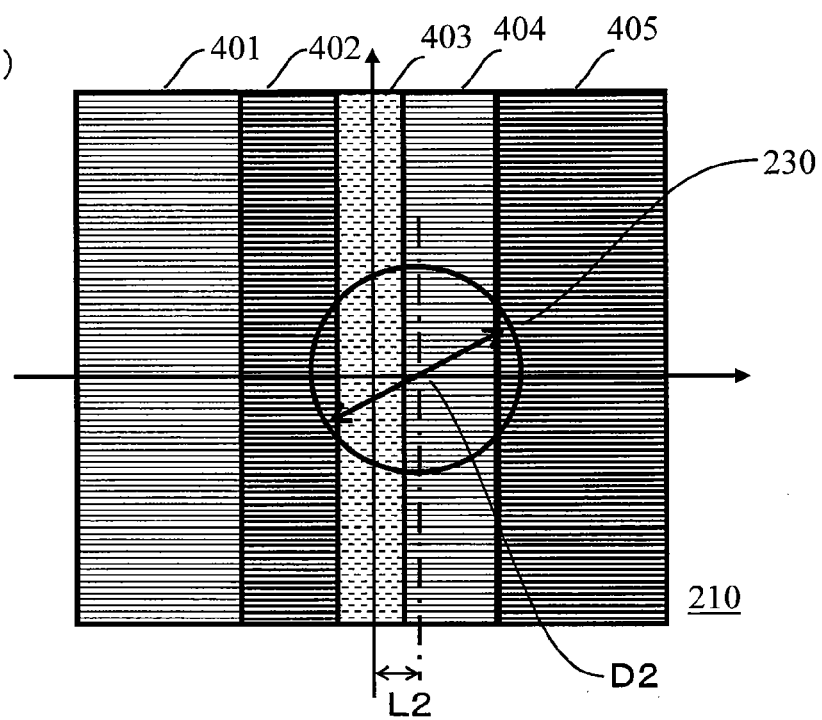

FIG. 4(a) shows the relationship between the front view of the diffraction grating 210 and the first light beam 202 emitted from the first light source. The diffraction grating 210 has the same outside dimensions as the diffraction grating 102 of the prior art example and are divided into five regions 401 to 405. In each of the regions, diffraction gratings of different phases are formed at constant intervals p. Generally, diffraction gratings are grooves repeatedly formed with a predetermined depth at constant intervals on a material such as glass and resin that have different refractive indexes from air. The phase of a diffraction grating is the positional relationship of the grooves. When the phase of the diffraction grating is different in one of the regions by 180° from that of an adjacent region, the peak and valleys of the grooves are replaced from each other on the boundary of the regions. Phases other than 180° are also defined by deviations between the peaks and valleys of the grooves.

In the diffraction grating 210, assuming that the phase of the diffraction grating is 0 in the central region 403, the region 402 adjacent to the region 403 on the left has a phase of +90°, the region 404 adjacent to the region 403 on the right has a phase of −90°, the region 401 adjacent to the region 402 on the left has a phase of −90°, and the region 405 adjacent to the region 404 on the right has a phase of +90°. The region 402 corresponds to a first region of the present invention, the region 403 corresponds to a second region of the present invention, the region 404 corresponds to a third region of the present invention, and the region 405 corresponds to a fourth region of the present invention.

A width W0 of the central region 403 is desirably set at about 10% to 30% of a diameter D1 of the light beam 202. In this case, during the reproduction of a disk having a large groove pitch as compared with an NA and a wavelength as on a DVD-RAM, even when the objective lens 213 moves in the track traversing direction and thus a deviation of the position relationship between the regions and the light beam occurs, the amplitude change of the tracking error signal is small.

Figure 5:
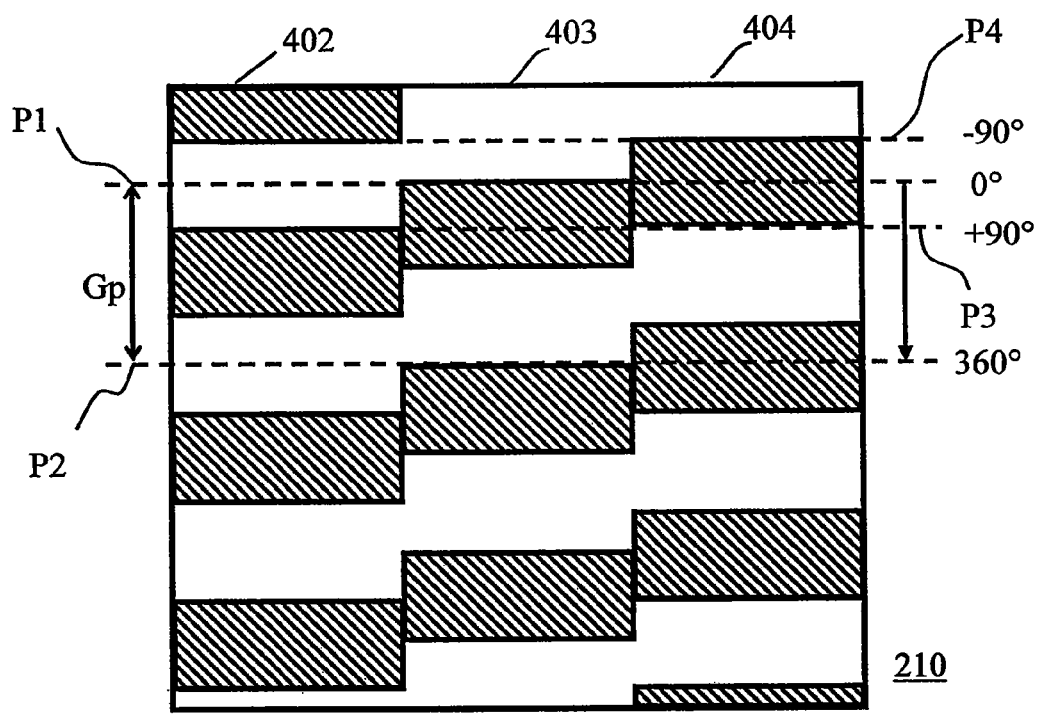
FIG. 5 is a schematic drawing showing an example of the phase relationship of a diffraction grating 210 according to the first embodiment of the present invention.

FIG. 5 is a schematic diagram showing an example of the phase relationship of the diffraction grating 210. FIG. 5 is an enlarged view partially showing the regions 402 to 404 of the diffraction grating 210. The three regions 402 to 404 are all made up of grooves each having a period Gp of a peak and a valley. When the region 403 has, for a phase of 360°, a starting point P1 on a groove end and a distance Gp from the starting point P1 to an end P2 of the subsequent groove, a groove end P3 of the region 402 is deviated from the starting point P1 by Gp/4 and thus the region 402 has a phase of +90°. A groove end P4 of the region 404 is deviated from the starting point P1 by Gp/4 in the opposite direction from P3 and thus the region 404 has a phase of −90°. Phase differences among the three regions are phase differences of wave fronts among the regions of the optical beams of the ±first-order light of the light beam diffracted by the grooves, and the phase differences are reflected on the phase distribution of the light beam.

FIG. 4(b) shows the relationship between the second light beam 230 emitted from the second light source and the diffraction grating 210. The light beam 230 is emitted from the second luminous point 201b, and the second luminous point 201b and the first luminous point 201a are spaced at the distance L1. Thus also on the diffraction grating 210, the light beam 230 passes through a position deviated from the center by a distance L2. The distance L2 is determined by the distance L1, a distance Lg between the first light source and the diffraction grating 210, a distance Loc between the collimator lens 104 and the objective lens 213, and a focal length Fcl of the collimator lens 104 and the distance L2 can be calculated by a method such as ray tracing. The detailed explanation thereof is omitted. The relation of the parameters is expressed as below:

$$L2 = L1 + L1 \cdot (Loc/Fcl - 1) \cdot Lg/Fcl$$

The following will describe how the diffraction grating 210 operates and a stable tracking error signal is obtained in the present embodiment.

In the case of the diffraction grating 102 divided only into the three regions 121, 122, and 123 according to the prior art example as shown in FIG. 6(a), the light beam 230 emitted from the second light source passes through a position deviated, as in FIG. 4(b), from the center of the central region 122 by a distance L2 as shown in FIG. 6(a). At this case, assuming that the region 121 has a phase of +90°, the region 122 has a phase of 0°, and the region 123 has a phase of −90°, the phase of the sub beam serving as the ±first-order diffracted light generated by the diffraction grating 102 is distributed as shown in FIG. 6(b). In other words, the left end has a phase of +90°, the center of the left side has a phase of 0°, and a part from around the center to the right side has a phase of −90°.

When the sub beam is diffracted by a track on the second optical disk, the phase distribution of the ±first-order diffracted light generated by the track also has the same phase distribution as the phase distribution of the original sub beam (see FIG. 6(b)), and the centers of the ±first-order diffracted light generated by the track deviate from the center of the original sub beam (see FIG. 6(b)) by an angle of ±λ/Tp as shown in FIG. 6(c). When this situation is expressed as a coordinate relationship on the diffraction grating 102, NA corresponds to D2/2 and thus the center positions are deviated by $\pm\lambda \cdot D2/(2Tp \cdot NA)$ where $\lambda$ is the wavelength of the light beam 230 emitted from the second light source, D2 is the beam diameter of the light beam 230 on the diffraction grating 102, Tp is the track pitch of the second optical disk, and NA is the numerical aperture of the objective lens 213 of the second light beam.

The ±first-order diffracted light generated by the track interferes with the zeroth-order light, and reflects a phase difference provided on the original wave front at that time.

FIG. 6(d) shows a phase difference occurring between the parts of zeroth-order light and ±first-order light depending on the track diffraction of the sub beam. In FIG. 6(d), solid lines indicate the zeroth-order light and broken lines indicate the ±first-order light. In the zeroth-order light, the left end has a phase difference of 180°, the central part of the left side has a phase difference of 90°, and a part close to the center of the zeroth-order light has a phase difference of 0°. On the right side, a part close to the center of the zeroth-order light has a phase difference of 180°, the central part has a phase difference of 90°, and the right end has a phase difference of 0°. As shown in FIG. 2, the sub beam is located on the same track as the main beam, so that the region having a phase difference of 0° in the sub beam generates a tracking error signal component having the same phase as the main beam, for a track deviation of the spot.

On the other hand, in the sub beam, the region having a phase difference of 180° generates a tracking error signal component shifted in phase from the main beam by 180°. The tracking error signal is obtained by subtracting the sub beam, which has been gain controlled in view of diffraction efficiency, from the main beam and the tracking error signal corrects an offset caused by a movement of the objective lens 213. When the sub beam has a tracking error signal component in phase with the main beam, the amplitude of the tracking error signal decreases. Thus in FIG. 6(d), the larger the region having a phase difference of 180°, the larger the tracking error signal of this system.

Figure 7:
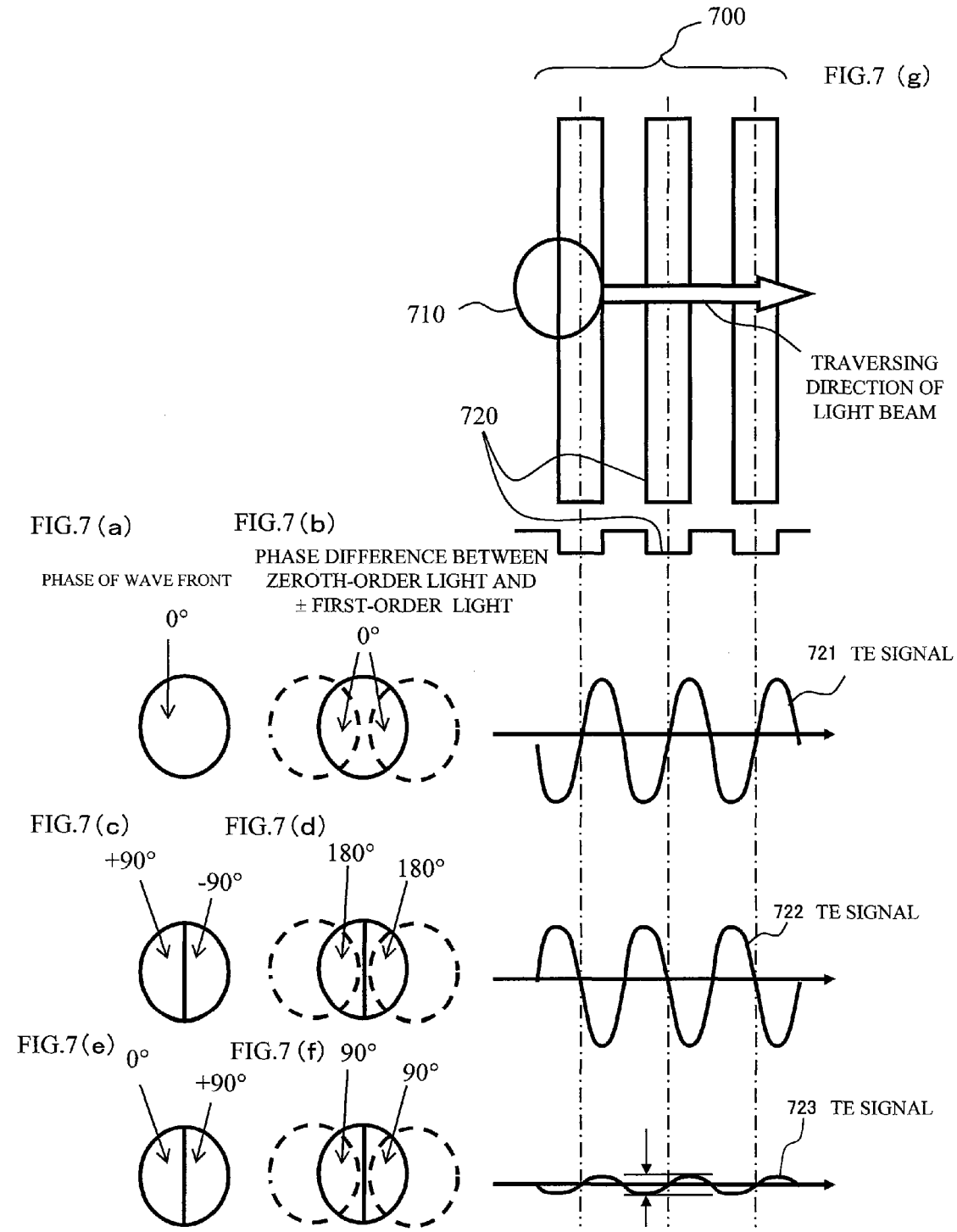
FIG. 7(a) is a diagram showing a state of zeroth-order light when no phase distribution is provided in the light beam focused on the optical disk.
FIG. 7(b) is a diagram showing a phase difference between ±first-order light and the zeroth-order light when no phase distribution is provided in the light beam focused on the optical disk.
FIG. 7(c) is a diagram showing a state of the zeroth-order light when a phase distribution divided into two regions with a phase difference of 180° is provided in the light beam focused on the optical disk.
FIG. 7(d) is a diagram showing a phase difference between the wave fronts of the ±first-order light and the zeroth-order light when a phase distribution divided into two regions with a phase difference of 180° is provided in the light beam focused on the optical disk.
FIG. 7(e) is a diagram showing a state of the zeroth-order light when a phase distribution divided into two regions with a phase difference of 90° is provided in the light beam focused on the optical disk.
FIG. 7(f) is a diagram showing a phase difference between the wave fronts of the ±first-order light and the zeroth-order light when a phase distribution divided into two regions with a phase difference of 90° is provided in the light beam focused on the optical disk.
FIG. 7(g) is a diagram showing a tracking error signal 721 obtained by the light beam traversing a track when no phase distribution is provided, a tracking error signal 722 obtained by the light beam traversing the track when the phase distribution divided into two regions with a phase difference of 180° is provided, and a tracking error signal 723 obtained by the light beam traversing the track when the phase distribution divided into the two regions with a phase difference of 90°.

Referring to FIG. 7, the following will more specifically describe the reason why the tracking error signal of this system increases as the region having a phase difference of 180° increases in FIG. 6(d), based on the relationship among the phase distribution of the front wave of the light beam focused on the optical disk, a phase difference between the wave fronts of ±first-order light diffracted by a track of the optical disk and zeroth-order light, and the tracking error signal obtained by the push-pull method when the light beam crosses a track.

As shown in FIG. 7(a), when the wave front of a light beam 710 focused on an optical disk 700 has no phase distribution (for example, when the light beam does not pass through the regions of different phases on the diffraction grating: expressed as 0°), a phase difference between the wave fronts of the ±first-order light diffracted by a track 720 of the optical disk 700 and zeroth-order light is determined by the positional relationship between the track 720 and the light beam 710 focused on the optical disk 700. Since no offset is made from the phase difference, a phase offset is 0° as shown in FIG. 7(b). At this point, the light beam 710 passes through the track 720 along an arrow of FIG. 7(g), so that a tracking error signal (TE signal) 721 is obtained as a push-pull signal as shown in FIG. 7(g).

On the other hand, in the case of a light beam used as a sub beam of an in-line method and having a phase distribution divided into two regions with a phase difference of 180° at the center as shown in FIG. 7(c) (for example, when the light beam passes through the two regions having a phase difference of 180° on the diffraction grating), a phase difference between the wave fronts of the ±first-order light diffracted by the track 720 of the optical disk 700 and the zeroth-order light is provided with offsets based on the initial phase difference, that is, a phase distribution provided beforehand, in addition to a phase determined by the positional relationship between the light beam 710 focused on the optical disk 700 and the track 720.

As shown in FIG. 7(d), the phase offsets are provided according to a difference between the initial phase distributions of the zeroth-order light and the ±first-order light at positions corresponding to the zeroth-order light and the ±first-order light. Thus the phase offsets are 180°. At this point, since the light beam 710 crosses the track 720, a TE signal 722 serving as a push-pull signal is obtained as shown in FIG. 7(g). The TE signal 722 has a sign inverted from that of the TE signal 721 corresponding to the cases of FIGS. 7(a) and 7(b). This is because the ±first-order light has a phase obtained from the positional relationship between the track 720 and the focus point of the light beam 710 when the light beam 710 crosses the track 720 and it appears that the phase is changed by 180° by the initial offset.

Moreover, in the case of a light beam having a phase distribution divided into two regions with a phase difference of 90° at the center as shown in FIG. 7(e), a phase difference between the wave fronts of the ±first-order light diffracted by the track 720 of the optical disk 700 and the zeroth-order light is provided with phase offsets of 90° as shown in FIG. 7(f), in addition to a phase determined by the positional relationship of the light beam 710 focused on the optical disk 700 and the track.

At this point, since the light beam 710 crosses the track 720, a TE signal 723 serving as a push-pull signal with an amplitude of substantially zero is obtained as shown in FIG. 7(g). This is because it appears that the phase of the ±first-order light obtained from the positional relationship between the track 720 and the focus point of the light beam 710 is changed by 90° by the initial offset when the light beam 710 crosses the track 720, and thus the +primary side and the primary side of push-pull have substantially the same contrast.

Therefore, in the case of an in-line arrangement using the differential push-pull method (the sub beam is located at the center of the same track as the main beam), the overall offset distribution of the phase difference of the sub beam is desirably set at 180° as shown in FIG. 7(d), in view of an amplitude after a differential push-pull operation. This is because when the push-pull signal of the sub beam is subtracted from the push-pull signal of the main beam in the differential push-pull operation, the push-pull signals have amplitudes with inverted signs and thus the amplitude of the signal increases after the operation.

On the other hand, when the offset distribution with a phase difference of 90° is provided as shown in FIG. 7(f), the push-pull signal (TE signal 723) of the sub beam has an amplitude of substantially zero and thus the amplitude of the signal is substantially equal to the amplitude of the push-pull signal of the main beam after the differential push-pull operation.

The tracking error signal is minimized in the state of FIG. 7(b) in which the sub beam has a phase of 0°. Since the main beam and the sub beam have the same signals, the differential push-pull operation reduces the signals to substantially zero. Thus when the region of the diffraction grating is divided, it is important to reduce a region where the offset of a phase difference is zero.

Returning to the explanation using the diffraction grating 102 of the prior art again, the case where the objective lens 213 moves will be examined with reference to FIGS. 8(a) to 8(d). FIG. 8(a) shows a state in which the position of the light beam 230 on the diffraction grating 102 is shifted by a predetermined amount "SHIFT" by a movement of the objective lens 213. At this case, the light beam 230 does not overlap the region 121 and is incident only on the region 122 and the region 123. In this case, in a phase distribution provided for a sub beam, the left end has a phase of 0° and a part from around a half of the left side to the overall right side has a phase of −90° as shown in FIG. 8(b). As shown in FIG. 8(c), ±first-order diffracted light generated by a track has a similar distribution.

When the distributions overlap each other, in the parts of zeroth-order light and the ±first-order light generated through track diffraction, the left end has a phase difference of 90°, a part around a half of the central part on the left side has a phase difference of 0°, a part close to the center on the right side has a phase difference of 90°, and the right end has a phase difference of 0° as shown in FIG. 8(d).

In this case, a part having a phase difference of 180° is eliminated and the part having a phase difference of 0° increases, so that components in phase with the main beam increases in the tracking error signal of the sub beam and the amplitude of the tracking error signal considerably decreases after an operation.

Referring to FIGS. 9(a) to 9(e), the following will describe the case where the diffraction grating 210 of the present embodiment is used.

In FIG. 9(a), the diffraction grating 210 of the present embodiment includes five regions 401, 402, 403, 404, and 405 from the left to the right. Thus as shown in FIG. 9(a), even when the center of the light beam 230 is shifted from the center of the region 403 by L2, the right end of the light beam 230 overlaps the region 405 across the region 404. Thus as shown in FIG. 9(b), in the phase distribution of the sub beam, the left end has a phase of +90°, the central part of the left side has a phase of 0°, a part from around the central part of the left side to the middle of the right side has a phase of −90°, and the right end has a phase of +90° again.

Next, FIG. 9(c) shows the phase distribution of the ±first-order diffracted light generated by a track. As shown in FIG. 9(c), the phase distribution of the ±first-order diffracted light generated by the track also has the same phase distribution as the phase distribution of the original sub beam (see FIG. 9(b)), and the centers of the ±first-order diffracted light generated by the track deviate from the center of the original sub beam (see FIG. 9(b)) by an angle of ±λ/Tp When the displacement is expressed as a coordinate relationship on the diffraction grating 210, NA corresponds to D2/2 and thus the center position is displaced by ±λD2/(2Tp·NA).

In this expression, λ is the wavelength of the light beam 230 emitted from the second light source, D2 is the beam diameter of the light beam 230 on the diffraction grating 210, Tp is the track pitch of the second optical disk, and NA is the numerical aperture of the objective lens 213 of the second light beam.

The ±first-order diffracted light generated by the track interferes with the zeroth-order light but reflects a phase difference provided on the original wave front at that time.

FIG. 9(d) shows a phase difference occurring between the parts of zeroth-order light and ±first-order light through track diffraction. In FIG. 9(d), solid lines indicate the zeroth-order light and broken lines indicate the ±first-order light. In the zeroth-order light, the left end has a phase difference of 180°, the central part of the left side has a phase difference of 90°, and a part close to the center of the zeroth-order light has a phase difference of 180° again. Also on the right side, a part close to the center of the zeroth-order light has a phase difference of 180°, the central part has a phase difference of 90°, and the right end has a phase difference of 180°.

By using the diffraction grating 210 of the present embodiment thus, it is possible to increase the region having a phase difference of 180°.

To provide such a phase distribution, the position of the ±first-order diffracted light generated by the track and the width of the region 404 have to satisfy a certain condition that the width W2 of the region 404 is not larger than amount of the deviation of the ±first-order diffracted light, which is generated by the track of the second light beam, from the zeroth-order diffracted light and the width W2 is desirably equal to a deviation λ·D2/(2Tp·NA) of the diffracted light. In other words, W2=λ·D2/(2Tp·NA) is satisfied.

Referring to FIGS. 10(a) to 10(d), the following will describe the case where the objective lens 213 is moved on the diffraction grating 210. FIG. 10(a) shows the case where the position of the light beam 230 on the diffraction grating 210 is shifted by the predetermined amount "SHIFT" by a movement of the objective lens. At this case, the light beam 230 does not overlap the region 402 and is incident on the region 403, the region 404, and the region 405. In this case, as shown in FIG. 10(b), in a phase distribution provided for the sub beam, the left end has a phase of 0°, a part from around a half of the left side to the middle of the right side has a phase of −90°, and the right end has a phase of +90°. As shown in FIG. 10(c), the ±first-order diffracted light generated by a track has a similar distribution. When the distributions overlap each other, in the parts of the zeroth-order light and the ±first-order light generated depending on track diffraction, the left end has a phase difference of 90°, a part around a half of the central part on the left side has a phase difference of 180°, a part close to the center of the right side has a phase difference of 90°, and a part on the right end has a phase difference of 180° as shown in FIG. 10(d). Also in this case, a part having a phase difference of 0° is eliminated and the region having a phase difference of 180° occupies at least a half of the distribution, so that the tracking error signal of the sub beam keeps components opposite in phase from the main beam and the amplitude of the tracking error signal does not decrease after an operation.

Further, W2 may be smaller than the deviation λ·D2/(2Tp·NA) of the diffracted light. In this case, as shown in FIG. 9(e), a light beam having passed through the region 403 and a light beam having passed through the region 405 overlap each other with a phase difference of 90°. Also light beams having passed through the region 403 and the region 404 overlap each other with a phase difference is 90°. Thus only the polarity of the phase difference is originally changed. Therefore, only the relationship of W2≦λ·D2/(2Tp·NA) may be satisfied.

Figure 11:
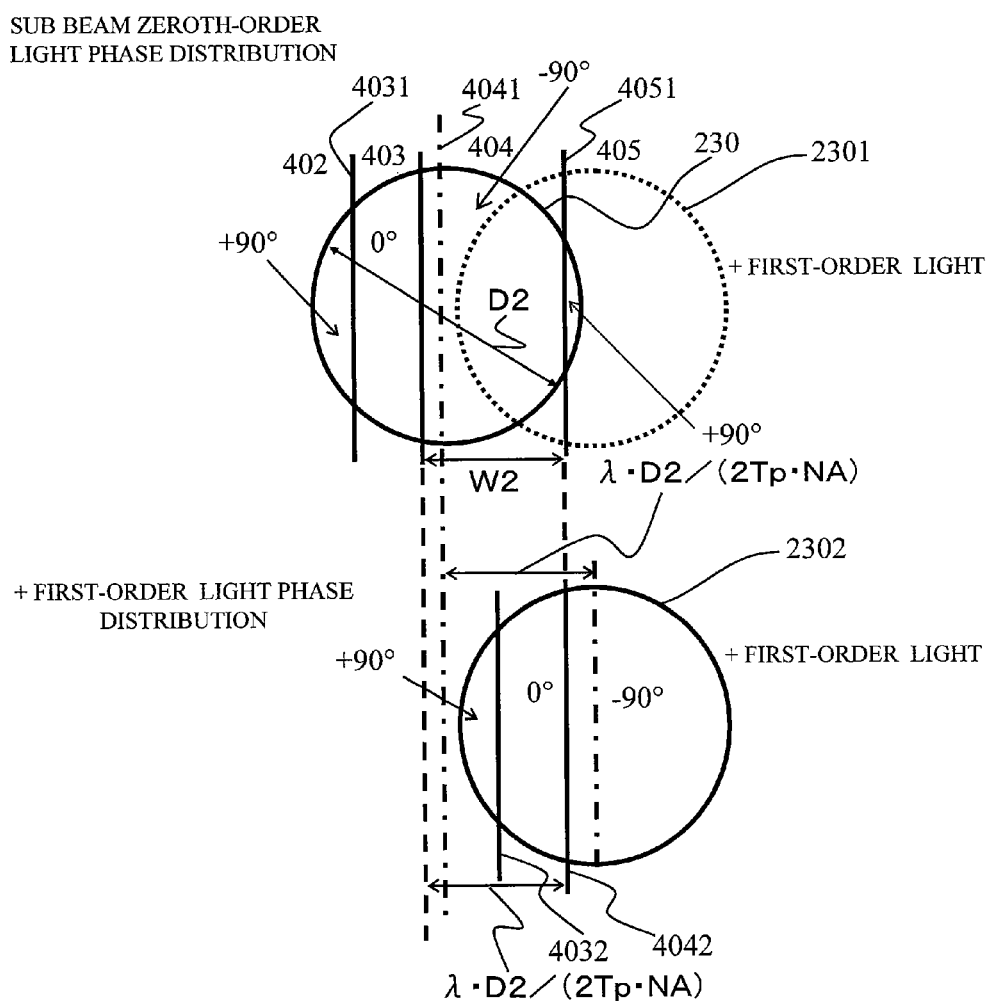
FIG. 11 is an explanatory drawing the phase distributions of the sub beam having passed through the diffraction grating according to the first embodiment of the present invention and +first-order diffracted light which is one of light beams diffracted on the optical disk.

FIG. 11 shows an extracted part of the phase distribution of the sub beam having passed through the diffraction grating 210 of FIG. 9 and the +primary diffracted light which is one of the light beams diffracted on the second optical disk.

The light beam 230 is divided into the regions 402, 403, 404, and 405 by dividing lines 4031, 4041, and 4051 of the diffraction grating 210. Regarding a sub beam which is a light beam diffracted by the diffraction grating 210, the region 402 has a phase distribution of +90°, the region 403 has a phase distribution of 0°, the region 404 has a phase distribution of −90°, and the region 405 has a phase distribution of +90°.

On the other hand, a +primary light beam 2302 diffracted on the second optical disk is diffracted at a position indicated by a broken line 2301 relative to the light beam 230 which is zeroth-order light. In order to avoid complication, the light beam 2302 is shifted downward in FIG. 11. Actually no light beam diffracted on the optical disk is reflected and returned onto the diffraction grating 210, however, a coordinate system and a scale on the diffraction grating 210 are used to clarify the intervals of the dividing lines.

The beam diameter of the light beam 230 is the diameter D2 on the diffraction grating 210, the center of the light beam 230 and the center of the +primary light beam 2302, which is diffracted light, are spaced at λ·D2/(2Tp·NA) where λ is a wavelength, NA is the numerical aperture of the objective lens, and Tp is an interval between tracks on the optical disk. This means that the dividing line 4041 which divides the region 403 and the region 404 on the light beam 230 is also projected as a dividing line 4042 at a position λ·D2/(2Tp·NA) apart. In other words, in a part on the right of the dividing line 4042 of the diffracted light beam 2302, the diffracted light has a phase of −90°.

If an interval (that is, the width of the region 404) W2 between the dividing line 4041 and the dividing line 4051 is larger than λ·D2/(2Tp·NA), the region 404 of the light beam 230 with a phase of −90° and the region of the diffracted light beam 2302 with a phase of −90° overlap each other with a phase difference of zero. Thus a tracking error signal having the same sign (the same phase of −90°) as the tracking error signal of the main beam is generated from this region, so that the amplitude of the tracking error signal is reduced. Therefore, in order to eliminate such a region, the relationship of W2 λ·D2/(2Tp·NA) is desirably satisfied. In this case, a phase difference between the light beam 230 and the diffracted light beam 2302 is 180° or 90° and no region having a phase difference of 0° is generated.

A specific numerical example will be described below. For example, it is assumed that a DVD and a CD are used as an optical disk, the first light beam has a wavelength of 660 nm, the objective lens 213 has an NA of 0.65, the second light beam has a wavelength of 785 nm, and the objective lens has an NA of 0.5. Further, the diameter D1 of the light beam 202 on the diffraction grating 210 is set at 1050 μm, W0 is set at 240 μm, and the diameter D2 of the second light beam 230 is set at 808 μm based on the ratio of NAs of the objective lens. W2 is set at 396 μm based on the track pitch Tp of a CD=1.6 μm.

FIGS. 12(a) to 12(c) show changes of the amplitude of each tracking error signal at this point relative to a movement of the objective lens (lens shift) in the track traversing direction. FIG. 12(a) shows an amplitude change of the tracking error signal when a DVD-RAM is reproduced. A change of an amplitude (TEpp) is expressed in decibels "dB" relative to an amplitude (TEpp_0) when the lens shift is zero. The expression is Y=20×log(TEpp/TEpp_0).

Moreover, the case where the diffraction grating 102 of the prior art example is used is expressed as "third zone" and is plotted by triangles in a graph. The case where the diffraction grating 210 according to the example of the present embodiment is used is expressed as "fifth zone" and is plotted by rhombuses in the graph.

Amplitude changes caused by lens shifts are substantially equal to each other. FIG. 12(b) shows an amplitude of a DVD-R. In the present embodiment, an amplitude change is somewhat larger but is −2 dB or less, which is sufficiently within a practical range even when the lens shift is 0.3 mm. FIG. 12(c) shows an amplitude change of a CD. In "third zone" of the prior art example, the amplitude decreases by 3 dB when the lens is shifted by about −0.1 mm. The amplitude decreases by 10 dB or more when the lens is shifted by −0.3 mm. On the other hand, in "fifth zone" of the present embodiment, the amplitude decreases by about 3 dB even when the lens is shifted by −0.3 mm. Thus it is understood that the present embodiment can remarkably suppress a reduction in amplitude when the lens is shifted.

Second Embodiment

Figure 13:
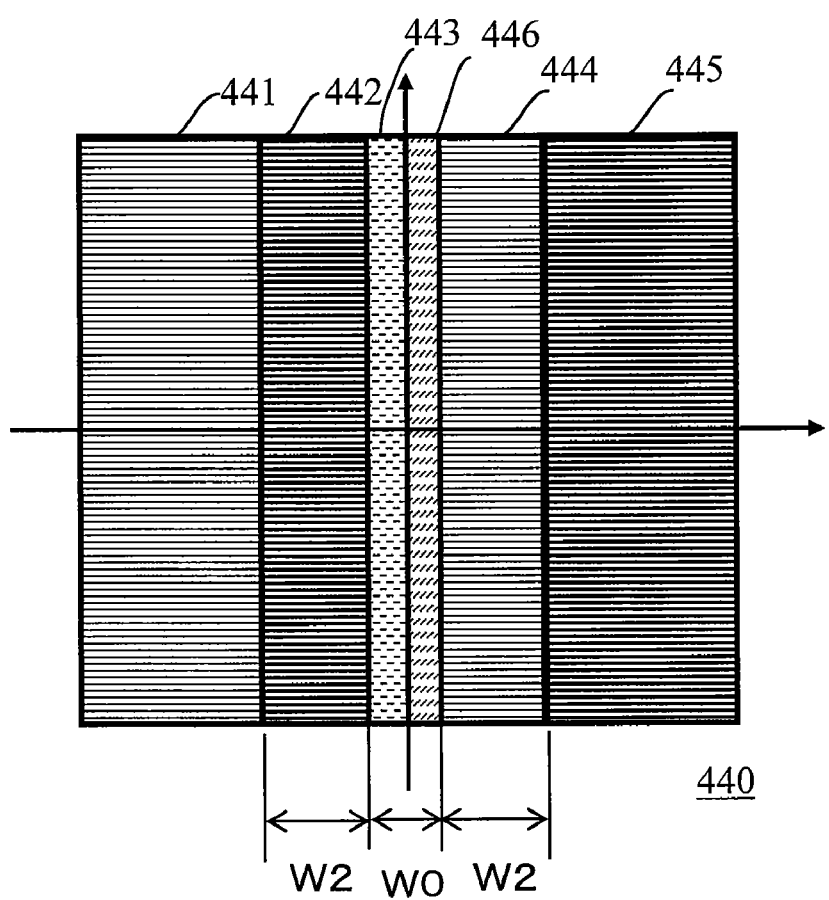
FIG. 13 is a diagram showing divided regions in an example of a diffraction grating according to a second embodiment of the present invention.

FIG. 13 shows the configuration of a diffraction grating 440 according to a second embodiment of the present invention. The diffraction grating 440 of the second embodiment is characterized in that a central region 403 of a diffraction grating 210 is further divided into two regions. Referring to FIG. 13, a region 441 corresponds to the region 401 of the diffraction grating 210, a region 442 corresponds to the region 402, a region 444 corresponds to the region 404, and a region 445 corresponds to the region 405 sequentially from the left.

In the diffraction grating 440, a region corresponding to the region 403 is divided into two regions 443 and 446. The region 443 has a phase of 0 and the region 446 has a phase of 180°. Further, the region 441 has a phase of −90°, the region 442 has a phase of +90°, the region 444 has a phase of −90°, and the region 445 has a phase of +90°. The region 443 corresponds to one of the two divided regions of the present invention and the region 446 corresponds to the other of the two divided regions of the present invention.

In the above configuration, the central regions 443 and 446 have phases of 0° and 180°, respectively, so that an average inclination is eliminated on the wave front of ±first-order diffracted light diffracted by the diffraction grating 440. Thus a symmetrical spot is advantageously obtained on an optical disk. This means that when the diffraction grating rotates relative to a track, the amplitude of a tracking error signal similarly changes on disks having different track pitches, achieving the effect of maximizing a TE amplitude at substantially the same angle relative to a deviation of rotation on a DVD-RAM, a DVD-R, and a CD.

Figure 14:
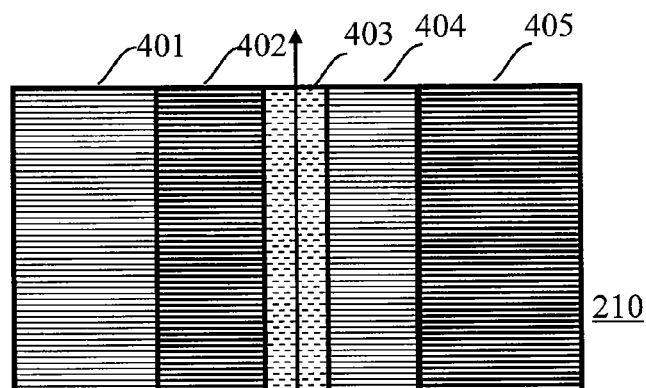
FIG. 14(a) is a diagram showing the diffraction grating and the phase relationship of each region according to the first embodiment of the present invention.
FIG. 14(b) is a graph in which the vertical axis indicates the phase of each region in a part of the diffraction grating and the horizontal axis indicates the position of each region according to the first embodiment of the present invention.
Figure 14:
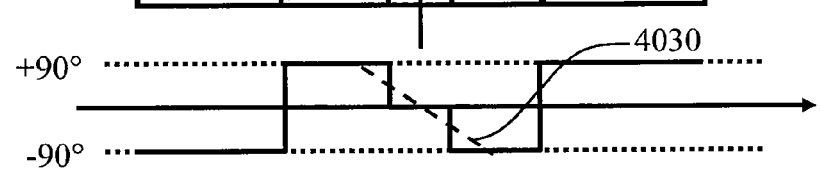
Figure 15:
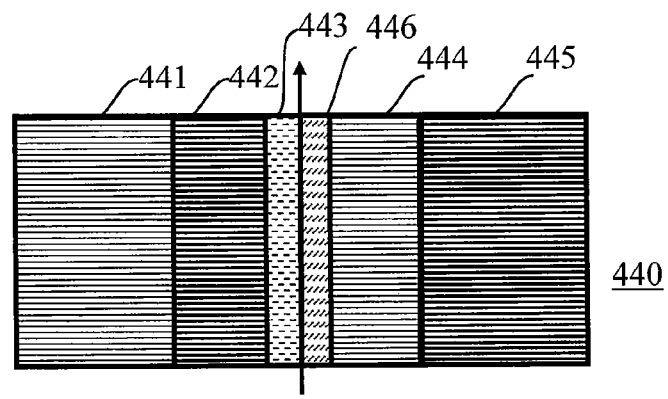
FIG. 15(a) is a diagram showing the diffraction grating and the phase relationship of each region according to the second embodiment of the present invention.
FIG. 15(b) is a graph in which the vertical axis indicates the phase of each region in a part of the diffraction grating and the horizontal axis indicates the position of each region according to the first embodiment of the present invention.
Figure 15:
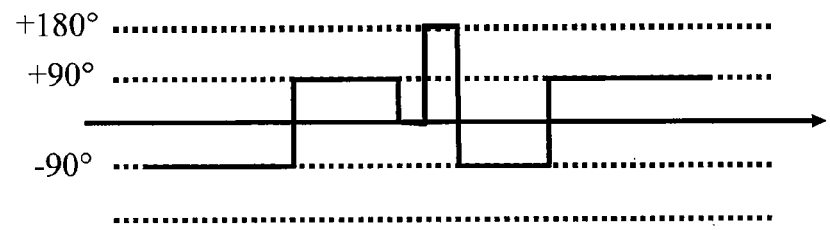

Referring to FIGS. 14(a), 14(b) and 15(a), 15(b), the detail will be described below. FIGS. 14(a), 14(b) are diagrams showing the diffraction grating 210 and the phase relationship of each region according to the first embodiment. FIGS. 15(a), 15(b) are diagrams showing the diffraction grating 440 and the phase relationship of each region according to the second embodiment. FIG. 14(a) shows a part of the diffraction grating 210 and FIG. 14(b) is a graph in which the vertical axis indicates the phase of each region of the part of the diffraction grating 210 and the horizontal axis indicates the position of each region.

Referring to FIG. 14(a), sequentially from the left, the region 401 has a phase of −90°, the region 402 has a phase of +90°, the region 403 has a phase of 0°, the region 404 has a phase of −90°, and the region 405 has a phase of +90°. Referring to FIG. 14(b), the average change of the phases of the regions 402, 403, and 404 relative to the region 403 is inclined on the graph as indicated by a broken line 4030. This inclination corresponds to the inclination of the wave front of the diffracted light beam in this direction and means that the center of the light quantity distribution of a light beam focused on the optical disk is deviated from an optical axis.

On the other hand, in the phase distribution of the diffraction grating 440 according to the second embodiment, the region 441 has a phase of −90°, the region 442 has a phase of +90°, the region 443 has a phase of 0°, the region 446 has a phase of +180°, the region 444 has a phase of −90°, and the region 445 has a phase of +90° sequentially from the left in FIG. 15(a). In this distribution, as shown in FIG. 15(b), an average phase change as in FIG. 14(b) is not found. Thus the wave front of the diffracted light beam is not inclined and the center of the light quantity distribution of the light beam focused on the optical disk is not deviated from the optical axis. Thus a symmetrical spot can be advantageously obtained on the optical disk.

Third Embodiment

Figure 16:
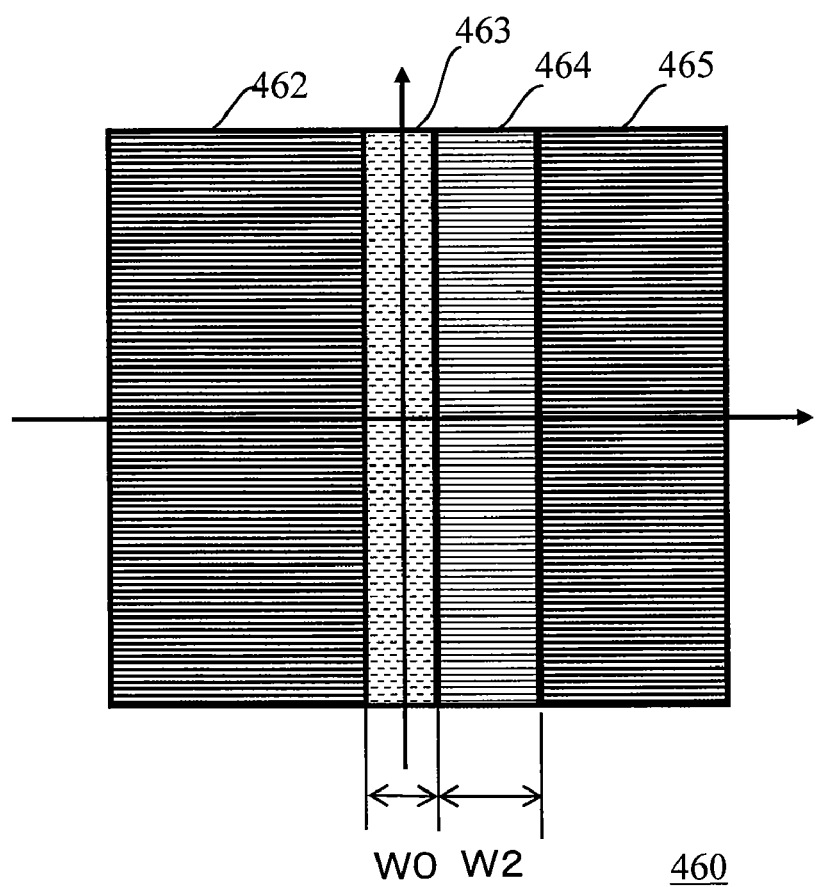
FIG. 16 is a diagram showing divided regions in an example of a diffraction grating according to a third embodiment of the present invention.

FIG. 16 shows the configuration of a diffraction grating 460 according to a third embodiment of the present invention. The example of the diffraction grating of the third embodiment is characterized in that a portion which generates a phase difference corresponding to region 401 has been omitted from the configuration of the diffraction grating 210 of the first embodiment. Referring to FIG. 16, a region 462 corresponds to the region 402 of the diffraction grating 210, a region 463 corresponds to the region 403, a region 464 corresponds to the region 404, and a region 465 corresponds to the region 405 sequentially from the left. When the region 463 has a phase of 0°, the region 462 has a phase of +90°, the region 464 has a phase of −90° and the region 465 has a phase of +90°. Where, the area of the region 462 corresponds to the sum of the regions 401 and 402 of the diffraction grating 210 of the first embodiment or is smaller than the sum.

Even if the shift of the objective lens is considered, the region 401 of the diffraction grating 210 of the first embodiment is a region which the light beam will not reach in fact, and the region 401 is provided so that the influence of the amplitude changes depending on the direction of the objective lens shifts, when a DVD is reproduced, may become the same.

Figure 12:
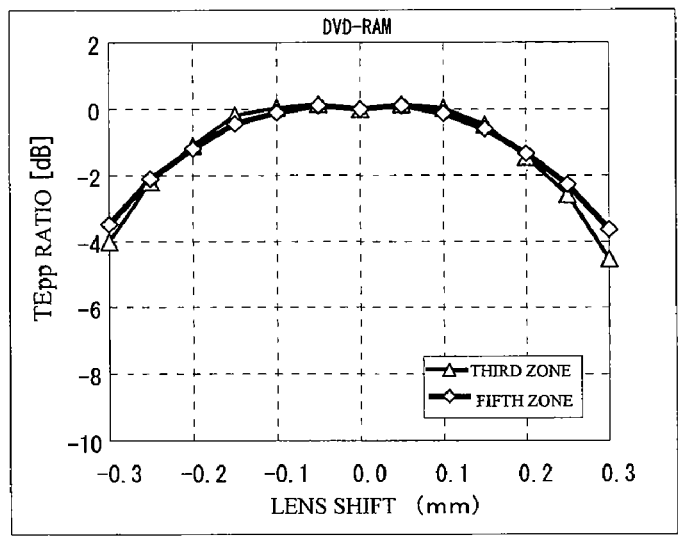
FIG. 12(a) is a diagram showing a calculation result of an amplitude change of the tracking error signal, the amplitude change being caused by a shift of the objective lens when a DVD-RAM disk is reproduced with the diffraction grating according to the first embodiment of the present invention.
FIG. 12(b) is a diagram showing a calculation result of an amplitude change of the tracking error signal, the amplitude change being caused by a shift of the objective lens when a DVD-R disk is reproduced with the diffraction grating according to the first embodiment of the present invention.
FIG. 12(c) is a diagram showing a calculation result of an amplitude change of the tracking error signal, the amplitude change being caused by a shift of the objective lens when a CD disk is reproduced with the diffraction grating according to the first embodiment of the present invention.
Figure 12:
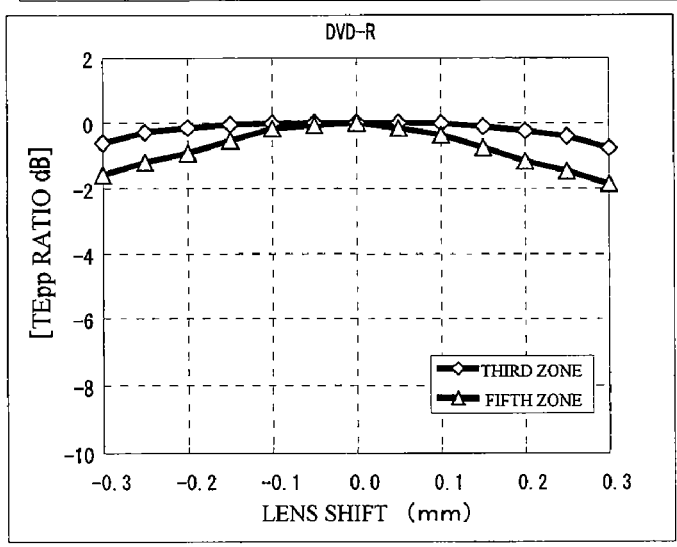
Figure 12:
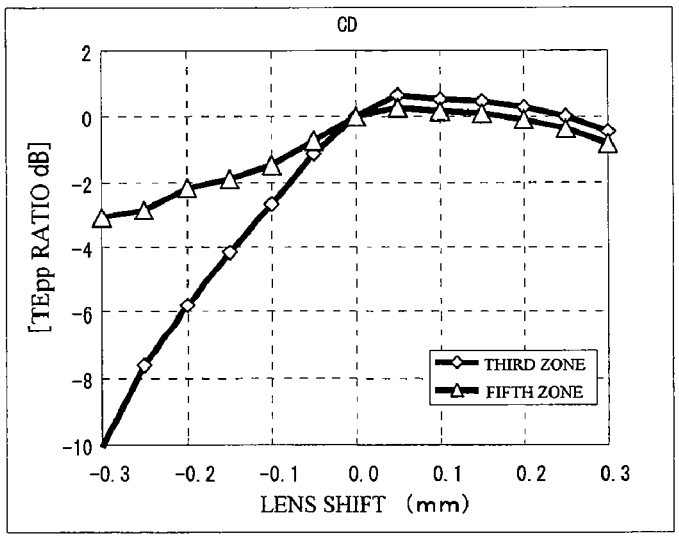

As shown in each figure of FIG. 12, in the case of DVD, the amplitude changes depending on the direction of the objective lens shifts is originally suppressed small as for DVD-R and DVD-RAM. Therefore, by the configuration that the region 401 is omitted from, the diffraction grating 460 has a right and left non-symmetric pattern with respect to a center axis, and the mistake of the direction of the assembly of the optical head can be lost, because that the direction of the diffraction grating 460 is easily distinguished.

Fourth Embodiment

Figure 17:
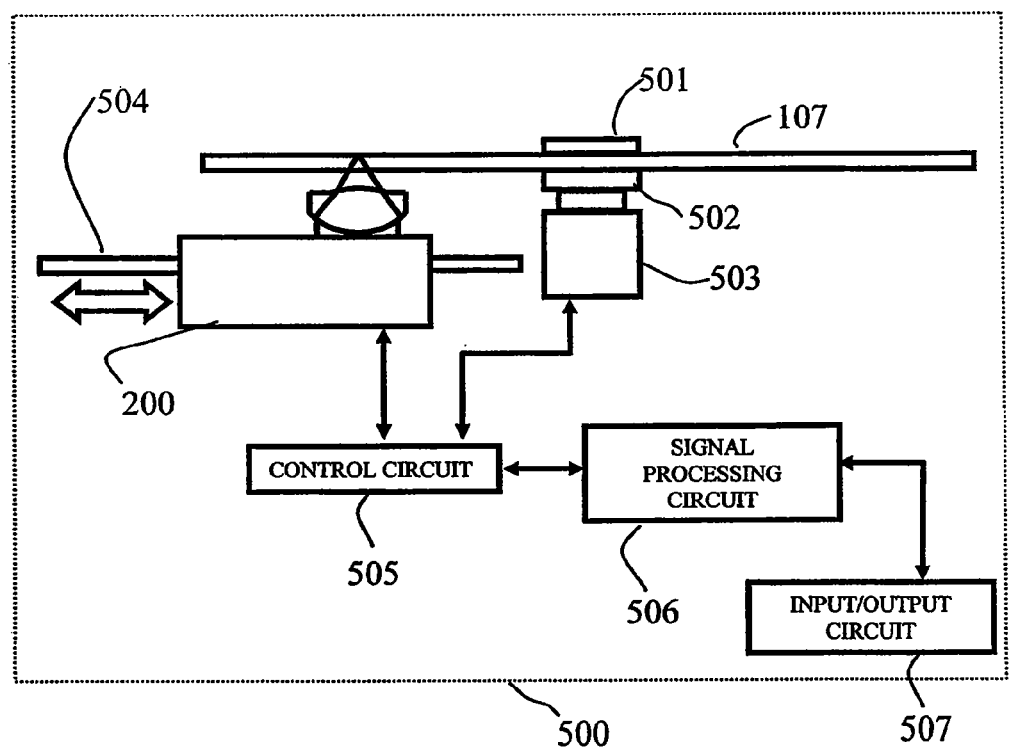
FIG. 17 is a structural diagram showing an optical head device according to a fourth embodiment of the present invention.

FIG. 17 shows a configuration example of a whole optical disk drive 500 serving as an optical information apparatus according to a fourth embodiment of the present invention. As shown in FIG. 17, an optical disk 107 is sandwiched and fixed by a clamper 501 and a turntable 502, and is rotated by a motor (rotational system) 503. An optical head device 200 described in the first embodiment rides on a traverse (which corresponds to the transfer system of the present invention) 504 so that spot of the light to be radiated can be moved from the inner periphery of the optical disk 107 to the outer periphery thereof. A control circuit 505 serving as the control circuit of the present invention performs focus control, tracking control, traverse control, rotation control of a motor, etc. on the basis of a signal received from the optical head device 200. Additionally, a signal processing circuit 506 performs reproduction of information from a reproduction signal and outputs it to an input/output circuit 507, and performs delivery of a signal from the input/output circuit 507 to the optical head 200 through the control circuit 505.

Accordingly, by the optical disk drive 500 using the optical head device 200 of the first embodiment, it is possible to perform steady tracking control because of the small amplitude changes of a tracking error signal, even if an objective lens moves in the track traversing direction when optical disks based on a different standard respectively are recorded and/or reproduced. Even in the case of an optical head having the diffraction grating 440 or 460 of the second and third embodiments, the same advantage is obtained respectively.

By using a double-wavelength semiconductor laser 201 emitting lights of two wavelengths, it is possible to fix the relationship of the optical sources stably than using two semiconductor lasers, and it is possible to reduce a relative position deviation of the optical sources depending to temperature or temporal changes. When the two semiconductor lasers are set to be side by side, it is necessary to enlarge the interval between the luminous points, because of obstruction by package. And thus an angle of view about the light beam which enters into the objective lens becomes large, so that it becomes difficult to reduce an aberration. Further, when the two light beams are synthesized by using prism and so on, the number of parts increases, because of the added prism. Such a problem doesn't occur if the double-wavelength semiconductor laser is used.

Incidentally, although the examples of DVD and CD using a red light (around 660 nm) and an infrared light (around 785 nm) as light beams have been stated in the above each embodiment, the present invention is not limited to such examples and even when a combination between a high density disk like Blu-ray Disk (BD) using a blue light (around 405 nm), HD DVD and so on and DVD using a red light, and a combination between BD using a blue light, HD DVD and CD using a infrared light, it is possible to obtain a similar effect.

Figure 18:
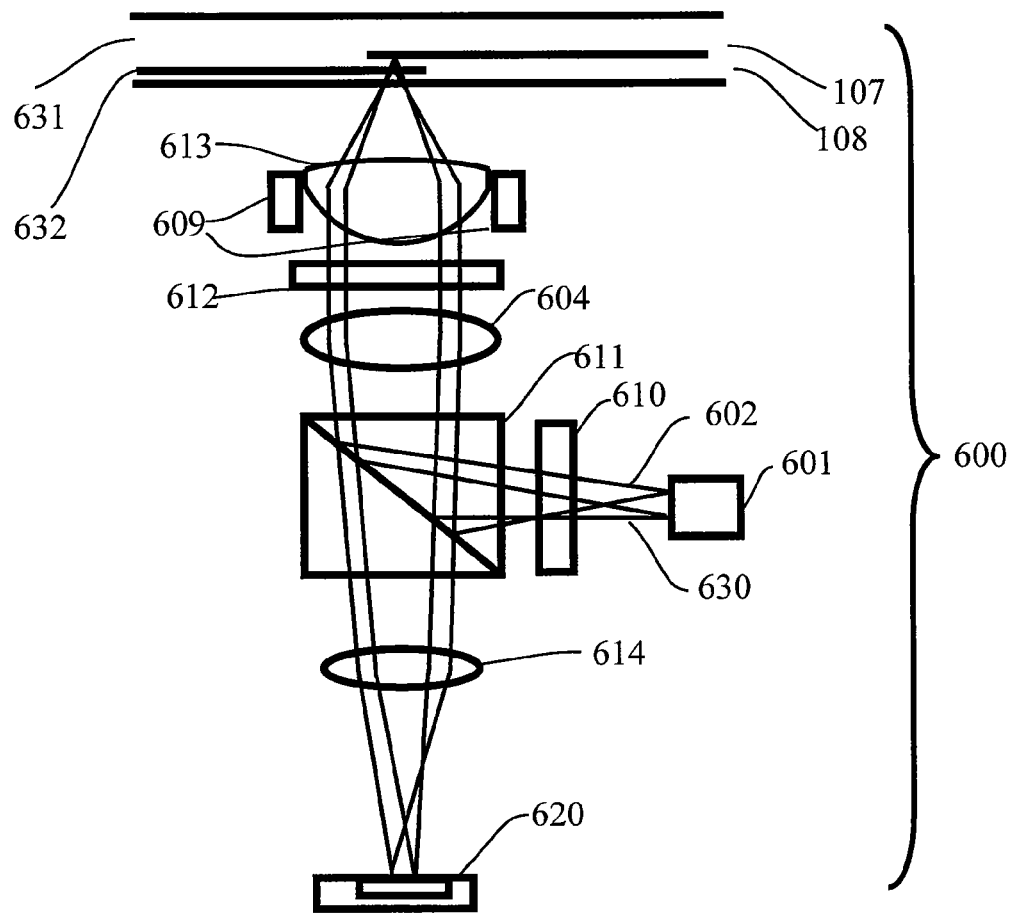
FIG. 18(a) is a diagram showing another structure of the optical head device of the present invention.
FIG. 18(b) is a schematic diagram showing another configuration of the double-wavelength light source of the optical head device according to the present invention.
Figure 18:
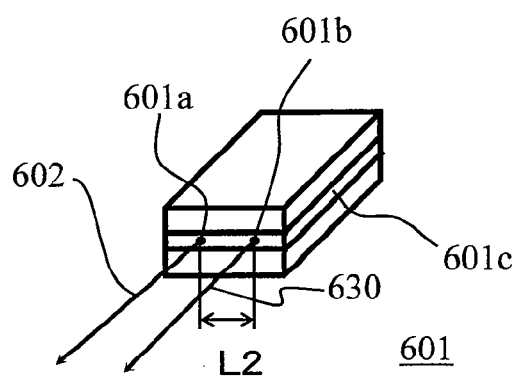

FIG. 18(a) shows an example of configuration of an optical head 600 using a light beam of a blue light and a light beam of a red light.

In FIG. 18(a), a semiconductor laser 601 acting as a light source is a double-wavelength semiconductor laser (double-wavelength light source). As shown in FIG. 18(b), the semiconductor laser 601 has two luminous points for each element. For example, the semiconductor laser 601 includes an active layer 601c having a first luminous point 601a and a second luminous point 601b. The first luminous point 601a emits a light beam (a first light beam) of red (around 660 nm) serving as a first wavelength and acts as a first light source, and the second luminous point 601b emits a light beam (a second light beam) of blue (around 405 nm) serving as a second wavelength and acts as a second light source. Normally, the luminous points of the respective light beams are spaced at a predetermined interval L2 (about 100 μm).

The explanation of FIG. 18(a) will be continued below. A light beam 602 (first light beam) emitted from the first luminous point 601a on the red side of the semiconductor laser 601 passes through a diffraction grating 610 which acts as a diffractive element of the present invention, and generates ±first-order diffracted light (not shown) acting as a sub beam of an in-line differential push-pull method. The light beam having passed through the diffraction grating 610 is reflected in a beam splitter 611 which acts as a splitting instrument of the present invention, and then the light beam is collimated through a collimator lens 604. The collimated light beam is circularly polarized through a λ/4 wave plate 612 for a double wavelength and is incident on a compatible objective lens (hereinafter, will be simply referred to as an "objective lens") 613 which acts as a focusing optical system of the present invention, and the light beam becomes convergent light. The convergent light is emitted to an optical disk 107 (for example, a DVD) acting as an information recording medium of the present invention.

The light reflected and diffracted in an information layer 108 of the optical disk 107 passes through the objective lens 613 again and then passes through the λ/4 wave plate 612 and the collimator lens 604. After that, the light transmits through the beam splitter 611. The objective lens 613 is moved in a direction along an optical axis and a direction perpendicular to a track by an actuator 609. The light beam having transmitted through the beam splitter 611 passes through a detection lens 614 and is incident on a photodetector 620.

On the other hand, a light beam 630 (second light beam) emitted from the second luminous point 601b on the blue side of the semiconductor laser 601 passes through the diffraction grating 610 and generates ±first-order diffracted light (not shown) acting as a sub beam of the in-line differential push-pull method. The light beam having passed through the diffraction grating 610 is reflected in the beam splitter 611 and then is collimated through the collimator lens 604. The collimated light beam is circularly polarized through the λ/4 wave plate 612 for a double wavelength, is incident on the compatible objective lens 613, and becomes convergent light. The convergent light is emitted to an optical disk 631 (for example, a Blu-Ray Disk) acting as an information recording medium of the present invention. The light reflected and diffracted in an information layer 632 of the optical disk 631 passes through the objective lens 613 again and then passes through the λ/4 wave plate 612 and the collimator lens 604. After that, the light transmits through the beam splitter 611. The light beam having transmitted through the beam splitter 611 passes through the detection lens 614 and is incident on the photodetector 620.

Even in the above configuration, by using a diffraction grating of the present invention shown in each embodiment and by the configuration of the diffraction grating shared by using a double-wavelength laser, it is possible to suppress the decrease in amplitude of the tracking error signal and then the tracking control can be performed stably even when an objective lens moves in the track traversing direction with respect to a Blu-Ray Disk.

Although it has been stated that the astigmatism method is used in the focus control, the focus control is not limited to such method and it is allowed to use the other method like the spot size detection method or knife edge method and the like.

Although, in the above each embodiment, it has been stated that the diffraction grating of the present invention has the configuration in which the phase of the central region is 0° and the each phase of the both end regions is +90° and −90° respectively, if a phase difference between the both end regions is near to 180°, the relation that the each phase of the both end regions is +90° and −90° respectively is not necessarily required, and a value of the each phase may be arbitrary. For example, the value of the each phase may be +60° and −120° respectively or may be +95° and −95° respectively. In this case, an amplitude of obtained a tracking error signal might decrease a little or depth of groove of a track, in which an amplitude change is minimized, might be different, however, it is possible to obtain an effect suppressing an amplitude change of a tracking error signal obtained by a basic configuration shown by the above each embodiment.

Although it has been stated that the present invention is carried out as an optical head device in the above each embodiment, the present invention may be carried out as an unit of diffractive element of a diffraction grating 210, 440 or 460 etc.

INDUSTRIAL APPLICABILITY

By an optical head device and an optical information apparatus and the like of the present invention, when the in-line differential push-pull method using two light sources is carried out, it is possible to achieve the tracking control stably. Consequently, it is possible to achieve low information error rate, thus it is useful as an external storage device of a computer and the like. For example, it is possible to apply the present invention also to the usage of a video recording apparatus like a DVD recorder, a BD recorder and a HD DVD recorder etc., and a video reproducing apparatus and the like. Moreover, it is possible to apply the present invention also to the usage of a car navigation system and a portable music player, and a storage device like a digital still camera and digital video camera.

The invention claimed is:

1. An optical head device, comprising:
   a first light source which emits a first light beam;
   a second light source which emits a second light beam;
   a focusing optical system which focuses a light beam selectively emitted from said first light source and said second light source to an information recording medium having a track as convergent light;
   a diffractive element which diffracts a part of said light beam passing from said light source toward said information recording medium;
   a splitting instrument which splits said light beam reflected or diffracted by said information recording medium, in a direction different from a direction to said light source; and
   a photodetector which receives said light beam split by said splitting instrument,
   wherein said diffractive element is divided into at least four regions by dividing lines along a tangential direction of said track of said information recording medium,
   said four regions are arranged in numeric order as first, second, third, and fourth regions,
   in an orthogonal direction with respect to said tangential direction of said track, a relationship of arrangement of said second region and said third region corresponds to a relationship of arrangement of an optical axis of said first light beam and an optical axis of said second light beam on said diffractive element,
   said second region is located at a position crossing said optical axis of said first light beam,
   a phase difference between a phase of said first region and a phase of said third region is 180°,
   a phase difference between a phase of said third region and a phase of said fourth region is 180°, and
   said third region has a width which is not larger than amount of a position deviation of ±first-orderdiffracted light of said second light beam from zeroth-order diffracted light, said ±first-orderdiffracted light being generated by said information recording medium.

2. The optical head device according to claim 1, wherein said phase of said first region has a phase difference of 90° from a phase of said second region.

3. The optical head device according to claim 1, wherein said diffractive element has a fifth region adjacent to said first region, and
a phase difference between a phase of said fifth region and said phase of said first region is 180°.

4. The optical head device according to claim 1, wherein when said first light beam includes a light beam corresponding to an aperture of said focusing optical system and said light beam has a diameter of D1 on said diffractive element, said second region has a width of 10% to 30% of D1.

5. The optical head device according to claim 1, wherein said third region has a width W2 which is not larger than λ·D2/(2Tp·NA),
where D2 is a diameter of a light beam, on said diffractive element, included in said second light beam and corresponding to an aperture of said focusing light system, Tp is a track interval of said information recording medium on which recording or reproduction is performed by said second light source, X is a wavelength of said second light beam, and NA is a numerical aperture of said focusing optical system of said second light beam.

6. The optical head device according to claim 1,
wherein said first light source and said second light source are formed on a same light emitting device, and
said first beam emitted from said first light source and said second light beam emitted from said second light source have different wavelengths.

7. An optical information apparatus, comprising:
an optical head device according to claim 1 which reads information from an information recording medium or records information on an information recording medium;
a transfer system which changes relative positions of said information recording medium and said optical head device; and
a control circuit which controls said transfer system and said optical head device.

8. The optical head device according to claim 2,
wherein said phase of said second region is 0° or 180°, and said phase of said first region is +90° or −90°.

9. The optical head device according to claim 2,
wherein said second region is divided into two regions, and a phase difference between phases of said two divided regions is 180°.

10. The optical head device according to claim 9,
wherein a phase of one of said two divided regions is 0° and a phase of said other region is 180°.

11. A diffractive element in an optical head device which comprises a first light source which emits a first light beam; a second light source which emits a second light beam; a focusing optical system which focuses a light beam selectively emitted from said first light source and said second light source, as convergent light to said information recording medium having a track; a splitting instrument which splits said light beam reflected or diffracted by said information recording medium, in a direction different from a direction to said light source; and a photodetector which receives said light beam split by said splitting instrument,
wherein said diffractive element diffracts a part of said light beam passing from said light source toward said information recording medium,
said diffractive element has at least four regions divided by dividing lines along a tangential direction of said track of said information recording medium,
said four regions are arranged in numeric order as first, second, third, and fourth regions,
in an orthogonal direction with respect to said tangential direction of said track, a relationship of arrangement of said second region and said third region corresponds to a positional relationship of a location where an optical axis of said first light beam and an optical axis of said second light beam pass,
said second region is located at a position crossing said optical axis of said first light beam,
a phase difference between a phase of said first region and a phase of said third region is 180°,
a phase difference between a phase of said third region and a phase of said fourth region is 180°, and
said third region has a width not larger than amount of a position deviation of ±first-orderdiffracted light of said second light beam from zeroth-order diffracted light, said ±first-orderdiffracted light being generated by said information recording medium.

* * * * *

UNITED STATES PATENT AND TRADEMARK OFFICE
CERTIFICATE OF CORRECTION

| | |
|---|---|
| PATENT NO. | : 8,259,554 B2 |
| APPLICATION NO. | : 12/680917 |
| DATED | : September 4, 2012 |
| INVENTOR(S) | : Kousei Sano et al. |

It is certified that error appears in the above-identified patent and that said Letters Patent is hereby corrected as shown below:

At column 23, line 4 of the Letters Patent, in claim 5 "X is a wavelength" should read --λ is a wavelength--.

Signed and Sealed this
Twenty-seventh Day of November, 2012

David J. Kappos
*Director of the United States Patent and Trademark Office*